United States Patent
Shinagawa et al.

(10) Patent No.: US 10,554,318 B2
(45) Date of Patent: Feb. 4, 2020

(54) TRANSMISSION DEVICE, TRANSMISSION METHOD, RECEPTION DEVICE, RECEPTION METHOD, AND PROGRAM

(71) Applicant: Sony Semiconductor Solutions Corporation, Kanagawa (JP)

(72) Inventors: Masashi Shinagawa, Tokyo (JP); Makoto Noda, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 15/753,981

(22) PCT Filed: Aug. 26, 2016

(86) PCT No.: PCT/JP2016/074914
§ 371 (c)(1),
(2) Date: Feb. 21, 2018

(87) PCT Pub. No.: WO2017/043329
PCT Pub. Date: Mar. 16, 2017

(65) Prior Publication Data
US 2018/0241490 A1   Aug. 23, 2018

Related U.S. Application Data

(60) Provisional application No. 62/216,742, filed on Sep. 10, 2015.

(51) Int. Cl.
*H04J 3/06* (2006.01)
*H04L 27/18* (2006.01)
*H04L 25/02* (2006.01)

(52) U.S. Cl.
CPC ............... *H04J 3/06* (2013.01); *H04L 27/18* (2013.01); *H04L 25/0202* (2013.01)

(58) Field of Classification Search
CPC ........................................................ H04L 76/27
See application file for complete search history.

(56) References Cited

U.S. PATENT DOCUMENTS 8,576,961 B1 * 11/2013 Zhu .................... H04L 27/2656
                                                        327/141
8,830,917 B1 *  9/2014 Zhang .................... H04W 4/00
                                                        370/329

(Continued)

FOREIGN PATENT DOCUMENTS

JP    2011-146974 A    1/2011
JP    2011-504015 A    1/2011

(Continued)

OTHER PUBLICATIONS

P.E. Pace et al., "Costas CW frequency hopping radar waveform: peak sidelobe improvement using Golay complementary sequences," IEEE, Electronics Letters, Jan. 21, 2010, vol. 46; No. 2, pp. 169-170.

(Continued)

*Primary Examiner* — Gerald A Smarth
(74) *Attorney, Agent, or Firm* — Michael Best & Friedrich LLP

(57) ABSTRACT

A present technology relates to a transmission device, a transmission method, a reception device, a reception method, and a program that can improve reception performance of a frame to which a preamble is added. A transmission device of one aspect of the present technology generates a preamble including a sequence [d d . . . d –d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d –d] and a sequence [d –d] is 25 or less. The (Continued)

generated preamble is added to data to be transmitted in units of frames. The present technology can be applied to a device that transmits and receives data via a wireless transmission path.

11 Claims, 28 Drawing Sheets

(56) References Cited

U.S. PATENT DOCUMENTS

| | | | | |
|---|---|---|---|---|
| 2003/0198308 A1* | 10/2003 | Hoctor | ................ | H04B 1/7183 375/354 |
| 2005/0105505 A1* | 5/2005 | Fishler | ................ | H04L 7/041 370/349 |
| 2009/0285269 A1* | 11/2009 | Zhang | ................ | H04B 1/70735 375/150 |
| 2012/0163415 A1* | 6/2012 | Su | ................ | H04B 1/7097 375/130 |
| 2014/0029681 A1* | 1/2014 | Zhang | ................ | H04L 1/0046 375/260 |

FOREIGN PATENT DOCUMENTS

| | | |
|---|---|---|
| JP | 2012-502565 A | 1/2012 |
| JP | 2012-209886 A | 10/2012 |

OTHER PUBLICATIONS

M. Lei et al., "CFR and SNR Estimation Based on Complementary Golay Sequences for Single-Carrier Block Transmission in 60-GHz WPAN," IEEE, Wireless Communications and Networking Conference, Apr. 5-8, 2009.

* cited by examiner

FIG. 12

| $[W_{n-1}\ W_n]$ | $a_n$ | | | | | | | $b_n$ | | | | | | |
|---|---|---|---|---|---|---|---|---|---|---|---|---|---|---|
| | $a_{n-2}$ | $b_{n-2}$ | $a_{n-2}$ | $-b_{n-2}$ | $a_{n-2}$ | $b_{n-2}$ | $a_{n-2}$ | $b_{n-2}$ | $a_{n-2}$ | $-b_{n-2}$ | | | | |
| $[+1\ +1]$ | $a_{n-2}$ | $b_{n-2}$ | $a_{n-2}$ | $-b_{n-2}$ | $a_{n-2}$ | $b_{n-2}$ | $a_{n-2}$ | $b_{n-2}$ | $-a_{n-2}$ | $b_{n-2}$ |
| $[+1\ -1]$ | $a_{n-2}$ | $b_{n-2}$ | $-a_{n-2}$ | $b_{n-2}$ | $a_{n-2}$ | $-b_{n-2}$ | $a_{n-2}$ | $-b_{n-2}$ | $a_{n-2}$ | $-b_{n-2}$ |
| $[-1\ +1]$ | $a_{n-2}$ | $-b_{n-2}$ | $-a_{n-2}$ | $b_{n-2}$ | $a_{n-2}$ | $-b_{n-2}$ | $a_{n-2}$ | $-b_{n-2}$ | $-a_{n-2}$ | $b_{n-2}$ |
| $[-1\ -1]$ | $a_{n-2}$ | $-b_{n-2}$ | $-a_{n-2}$ | $-b_{n-2}$ | $a_{n-2}$ | $-b_{n-2}$ | $a_{n-2}$ | $-b_{n-2}$ | $a_{n-2}$ | $b_{n-2}$ |

FIG. 16

| Form | a | | b | |
|---|---|---|---|---|
| binary | (waveform) | | (waveform) | |
| Hexadecimal | A55566966C33300F00FFFCC3C6999AA5A | A5556696C33300F0F00033C39C6655A5 | | |

FIG. 17

| 0 | 15.3c | 11ad | NEW |
|---|---|---|---|
| WEIGHT VECTOR W | [+1, +1, +1, +1, +1, +1, -1] | [+1, -1, -1, -1, +1, -1, +1] | [-1, -1, -1, +1, +1, -1, -1] |
| DELAY VECTOR D | [64, 32, 8, 2, 16, 1, 4] | [1, 8, 2, 4, 16, 32, 64] | [8, 4, 16, 2, 32, 1, 64] | ns. On Circuits and Systems, vol. 60, no. 10, pp. 2730-2739, October 2013.

TRANSMISSION DEVICE, TRANSMISSION METHOD, RECEPTION DEVICE, RECEPTION METHOD, AND PROGRAM

TECHNICAL FIELD

The present technology relates to a transmission device, a transmission method, a reception device, a reception method, and a program, and in particular relates to a transmission device, a transmission method, a reception device, a reception method, and a program that can improve reception performance of a frame to which a preamble is added.

BACKGROUND ART

In wireless or wired data transmission, a bit sequence of transmission data is typically divided into units of frames or packets, and data is transmitted using the frames or packets. Hereinafter, frames and packets are collectively referred to as frames as appropriate. A frame is a unit of one block of the bit sequence transmitted at one time.

In a case of transmitting data in units of frames, a transmission-side device inserts a known signal for synchronization in the head of the frame so that a reception-side device can make synchronization. The reception-side device detects the known signal for synchronization to perform frame synchronization, and acquires transmission data stored in the frame.

Normally, one frame is configured from a preamble configured from a known signal, which is arranged in the head, and followed by a header and a payload. The known signal for synchronization is also included in the preamble. A known signal for channel estimation is also included in the preamble. Note that the header includes frame attribute information such as a transmission method and an address, and the payload includes the bit sequence of the divided transmission data.

CITATION LIST

Patent Document

Patent Document 1: Japanese Patent Application Laid-Open No. 2011-504015

Non-Patent Document

Non-Patent Document 1: "Wireless Medium Access Control (MAC) and Physical Layer (PHY) Specifications for High Rate Wireless Personal Area Networks (WPANs)," IEEE Std 802.15.3c-2009.
Non-Patent Document 2: "Wireless LAN Medium Access Control (MAC) and Physical Layer (PHY) Specifications: Enhancements for Very High Throughput in the 60 GHz Band," IEEE Std 802.11ad-2012
Non-Patent Document 3: J. Min et. Al. "Synchronization Techniques for a Frequency-Hopped Wireless Transceiver," IEEE VETEC, vol. 1, pp. 183-187, 1996.
Non-Patent Document 4: M. J. E. Golay, "Complementary series," IRE Transactions on Information Theory, vol. 7, Issue 2, pp. 82-87, April 1961.
Non-Patent Document 5: S. Z. Budisin, "Efficient pulse compressor for Golay complementary sequences," IEEE electronics letters, vol. 27, No. 3, pp. 219-220, 1991.
Non-Patent Document 6: W. C. Liu et al., "A Digital Golay-MPIC Time Domain Equalizer for SC/OFDM Dual-Modes at 60 GHz Band," IEEE Trans. On Circuits and Systems, vol. 60, no. 10, pp. 2730-2739, October 2013.

SUMMARY OF THE INVENTION

Problems to be Solved by the Invention

In frame synchronization, cross correlation between a received signal sequence and a known signal sequence is calculated, and a position at which a cross correlation equal to or greater than a threshold value is obtained, or a position at which a peak of the cross correlation which is the maximum is obtained is specified. To lower the failure probability of the frame synchronization, reduction of a level of a side lobe generated outside the peak position is required.

Further, in the channel estimation, a peak position of cross correlation between a received signal sequence and a known signal sequence is set as a main wave position, a section of zero-cross correlation is formed before and after the peak position, and a path appearing within a section of zero-cross correlation is detected. To detect a path with a long delay, securing of a longer section of zero-cross correlation is required.

The present technology has been made in view of the foregoing, and improves reception performance of a frame to which a preamble is added.

Solutions to Problems

A transmission device of a first aspect of the present technology includes a generation unit configured to generate a preamble including a sequence [d d . . . d −d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d −d] and a sequence [d −d] is 25 or less, and a transmission unit configured to transmit data to be transmitted in units of frames to which the preamble is added.

A transmission device of a second aspect of the present technology includes a generation unit configured to generate a preamble including a combination of sequences a and b that are Golay complementary sequences and sequences −a and −b that are inverted sequences of the sequences a and b, and including, in a channel estimation sequence, a signal sequence of any of a first basic sequence [a b a −b a b −a b], a second basic sequence [a b −a b a b a −b], a third basic sequence [a −b a b a −b −a −b], a fourth basic sequence [a −b −a −b a −b a b], inverted sequences of the first to fourth basic sequences, reverse sequences of the first to fourth basic sequences, and reverse sequences of the inverted sequences of the first to fourth basic sequences, and a transmission unit configured to transmit data to be transmitted in units of frames to which the preamble is added.

A reception device of a third aspect of the present technology includes a reception unit configured to receive a transmission signal of data in units of frames to which a preamble is added, the preamble including a sequence [d d . . . d −d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d −d] and a sequence [d −d] is 25 or less, a demodulation unit configured to apply demodulation processing to a received signal, and a synchronization unit configured to obtain cross correlation between a received signal sequence obtained by the demodulation processing and the sequence [d −d] or cross correlation between the received signal sequence and the sequence [d d −d], and perform frame synchronization on the basis of threshold detection or maximum value detection of a cross correlation value.

A reception device of a fourth aspect of the present technology includes a reception unit configured to receive a transmission signal of data in units of frames to which a preamble is added, the preamble including a combination of sequences a and b that are Golay complementary sequences and sequences −a and −b that are inverted sequences of the sequences a and b, and including, in a channel estimation sequence, a signal sequence of any of a first basic sequence [a b a −b a b −a b], a second basic sequence [a b −a b a b a −b], a third basic sequence [a −b a b a −b −a −b], a fourth basic sequence [a −b −a −b a −b a b], inverted sequences of the first to fourth basic sequences, reverse sequences of the first to fourth basic sequences, and reverse sequences of the inverted sequences of the first to fourth basic sequences, a demodulation unit configured to apply demodulation processing to a received signal, a synchronization unit configured to perform frame synchronization on the basis of a received signal sequence obtained by the demodulation processing, and an equalization unit configured to obtain first cross correlation between the received signal sequence and first four sequences of the signal sequences included in the channel estimation sequence, obtain second cross correlation between the received signal sequence and last four sequences of the signal sequences, and perform channel estimation on the basis of the first cross correlation and the second cross correlation.

Effects of the Invention

According to the present technology, reception performance of a frame to which a preamble is added can be improved.

Note that effects described here are not necessarily limited, and any of effects described in the present disclosure may be exhibited.

BRIEF DESCRIPTION OF DRAWINGS

FIG. 12 is a diagram illustrating an example of a signal sequence included in a channel estimation signal sequence.

FIG. 16 is a diagram illustrating examples of GCSs a and b constituting a new preamble.

FIG. 17 is a diagram illustrating a weight vector W and a delay vector D for generating GCSs a and b.

MODE FOR CARRYING OUT THE INVENTION

Hereinafter, modes for carrying out the present technology will be described. Description will be given in the following order.

1. Example of Preamble
2. IEEE 802.15.3c and IEEE 802.11ad
3. Concept of Preamble to Which Present Technology is Applied
4. Transmission System
5. Preamble to Which Present Technology is Applied
6. Configurations and Operations of Devices
7. Method of Determining GCSs a and b
8. Others <<1. Example of Preamble>>

Figure 1:
FIG. 1 is a diagram illustrating a configuration example of a frame.

FIG. 1 is a diagram illustrating a configuration example of a frame.

In a wireless or wired data transmission system, data to be transmitted is divided into a plurality of frames and stored, and the data is transmitted in units of frames.

For example, communication standards of data via a wireless transmission path include IEEE 802.15.3c, which is an international standard of a wireless personal area network (PAN) using a 60 GHz band, and IEEE 802.11ad, which is an international standard of a wireless local area network (LAN) using a 60 GHz band.

As illustrated in FIG. 1, a preamble is arranged in a head of each frame, and a header and a payload are arranged following the preamble. The preamble includes a known signal and the header includes frame attribute information such as a transmission method and an address. The payload includes a bit sequence of divided transmission data.

Figure 2:
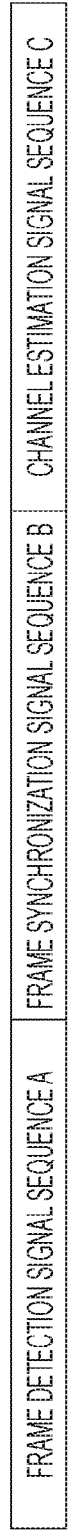
FIG. 2 is a diagram illustrating a configuration example of a preamble.

FIG. 2 is a diagram illustrating a configuration example of the preamble.

The preamble is configured from a frame detection signal sequence A that is a signal sequence for frame detection, a frame synchronization signal sequence B that is a signal sequence for frame synchronization, and a channel estimation signal sequence C that is a signal sequence for channel estimation.

A device that has received such a preamble performs auto gain control (AGC) and frame detection using the frame detection signal sequence A, and performs frame synchronization using the frame synchronization signal sequence B. Further, a reception-side device performs channel estimation using the channel estimation signal sequence C. A part of each sequence may be shared with another sequence.

<<2. IEEE 802.15.3c and IEEE 802.11ad>>
<2-1. Preamble Configuration>

Prior to description of the preamble to which the present technology is applied, preambles of IEEE 802.15.3c and IEEE 802.11ad will be described. In IEEE 802.15.3c and IEEE 802.11ad, a preamble configuration as illustrated in FIG. 2 is adopted. IEEE 802.15.3c and IEEE 802.11ad are described in Non-Patent Documents 1 and 2, respectively.

Figure 3:
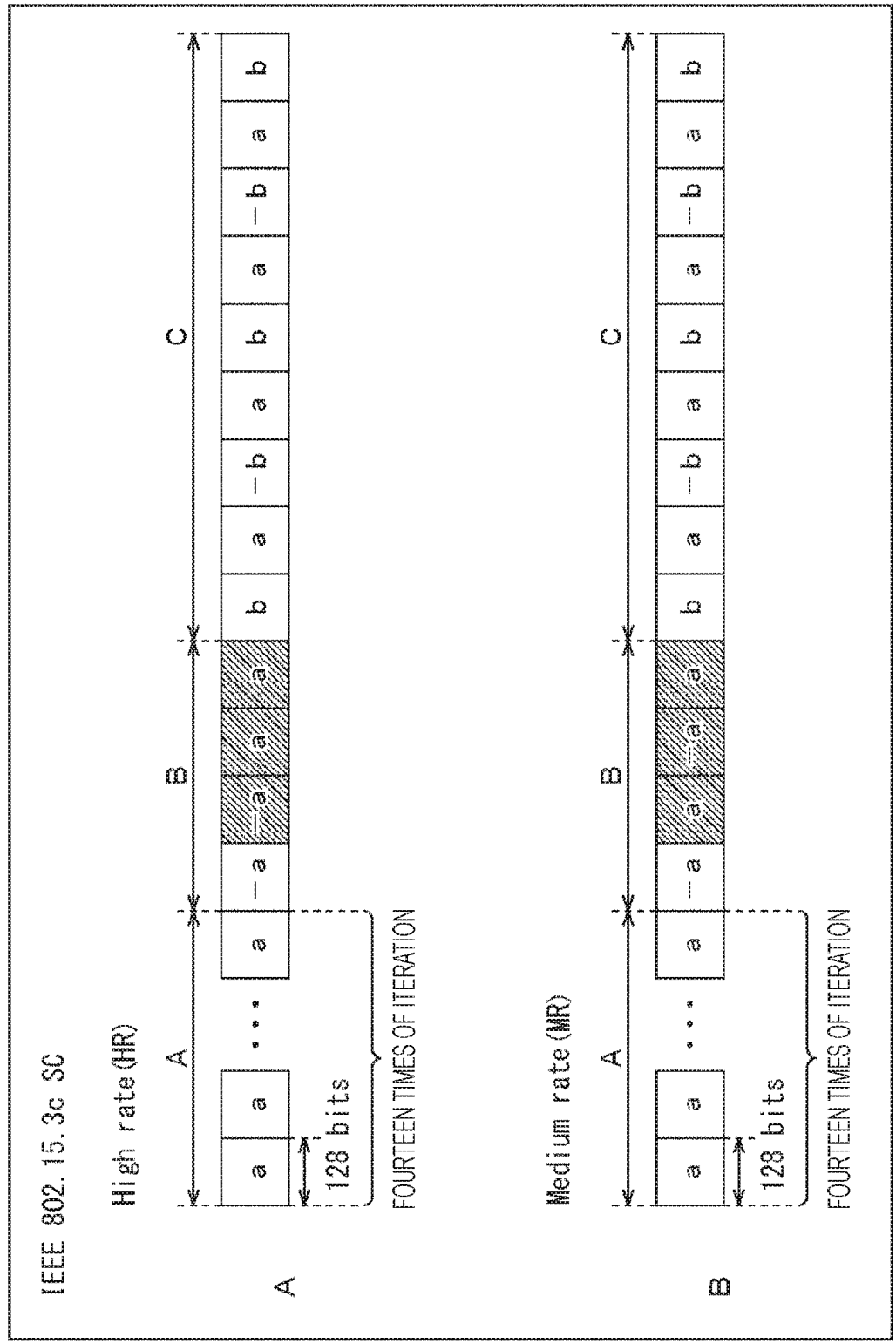
FIG. 3 is a diagram illustrating a configuration of a preamble of IEEE 802.15.3c.

A and B in FIG. 3 are diagrams illustrating the configuration of the preamble (single carrier (SC) PHY preamble) of IEEE 802.15.3c. A in FIG. 3 illustrates the configuration of the preamble in a high rate mode, and B in FIG. 3 illustrates the configuration of the preamble in a medium rate mode.

The preamble of IEEE 802.15.3c is configured from GCSs a and b that are Golay complementary sequences (GCS) of a length of 128 symbols (128 bits), GCSs −a and −b that are bit inverted sequences of GCSs a and b.

For example, the frame detection signal sequence A constituting the preamble illustrated in A in FIG. 3 is configured from fourteen times of iteration of GCS a. The frame synchronization signal sequence B is configured from [−a −a a a] and the channel estimation signal sequence C is configured from [b a −b a b a −b a b]. Hereinafter, the preamble of IEEE 802.15.3c will be described using the preamble in the high rate mode illustrated in A of FIG. 3.

Figure 4:
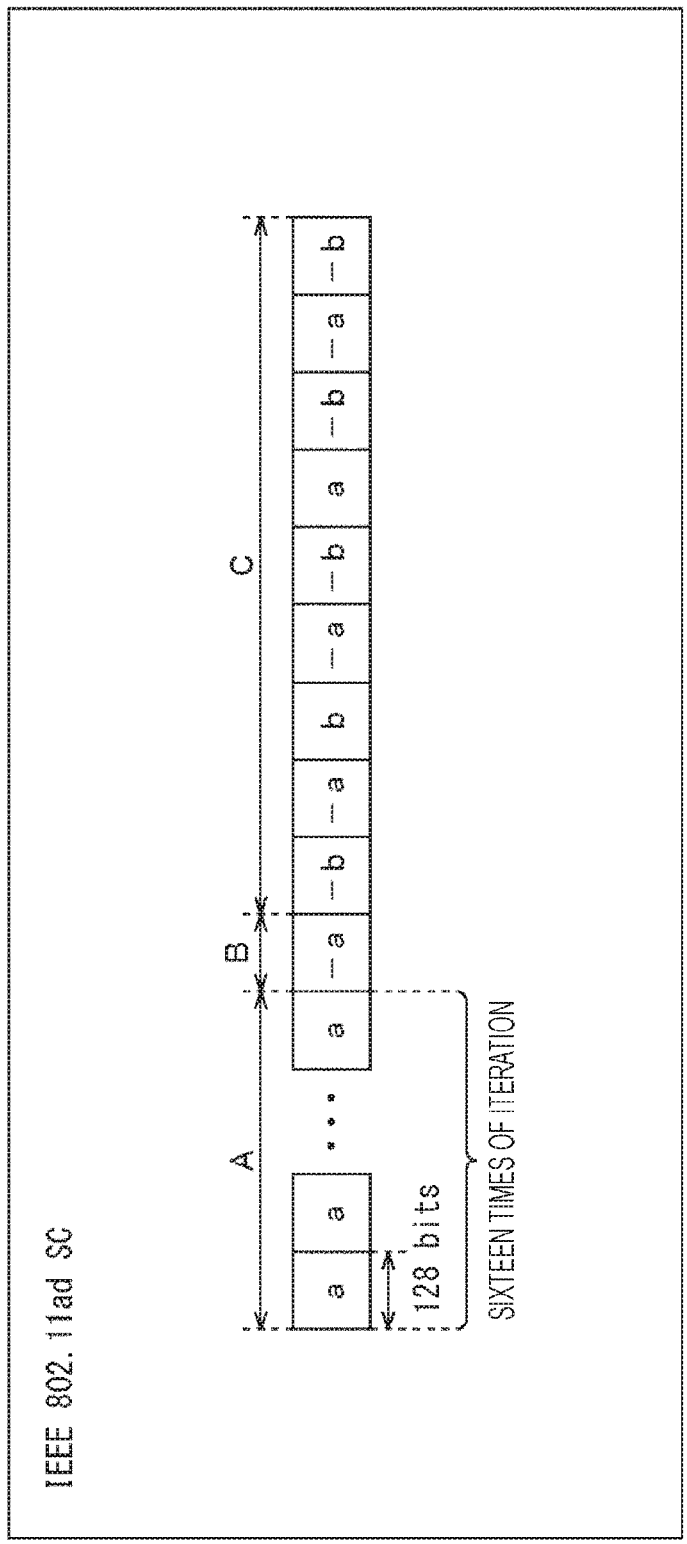
FIG. 4 is a diagram illustrating a configuration of a preamble of IEEE 802.11ad.

FIG. 4 is a diagram illustrating a configuration of a preamble (SC PHY preamble) of IEEE 802.11ad.

The preamble of IEEE 802.11ad is also configured from GCSs a and b of a length of 128 symbols, and GCSs −a and −b that are bit inverted sequences of GCSs a and b.

The frame detection signal sequence A constituting the preamble illustrated in FIG. 4 is configured from sixteen times of iteration of GCS a. The frame synchronization signal sequence B is configured from GCS −a, and the channel estimation signal sequence C is configured from [−b −a b −a −b a −b a −b].

In A and B in FIG. 3 and FIG. 4, the GCS constituting the preambles of IEEE 802.15.3c and IEEE 802.11ad are represented by the same symbols a and b. However, in reality, different signal sequences are adopted for the GCSs a and b of IEEE 802.15.3c and for the GCSs a and b of IEEE 802.11ad.

Note that, in IEEE 802.15.3c, the lead GCS −a of the frame synchronization signal sequence B is used for frame synchronization, and the following three [−a a a] (A in FIG. 3) or [a −a a] (B in FIG. 3) are used for detection of the type (the high rate or the medium rate) of the following header. Further, in IEEE 802.11ad, the collective sequence of the frame detection signal sequence A and the frame synchronization signal sequence B is defined as a short training field (STF). The STF is configured from sixteen times of iteration of GCS a corresponding to the frame detection signal sequence A and GCS −a corresponding to the frame synchronization signal sequence B, when the STF is divided by function.

<2-2. Frame Synchronization>

Figure 5:
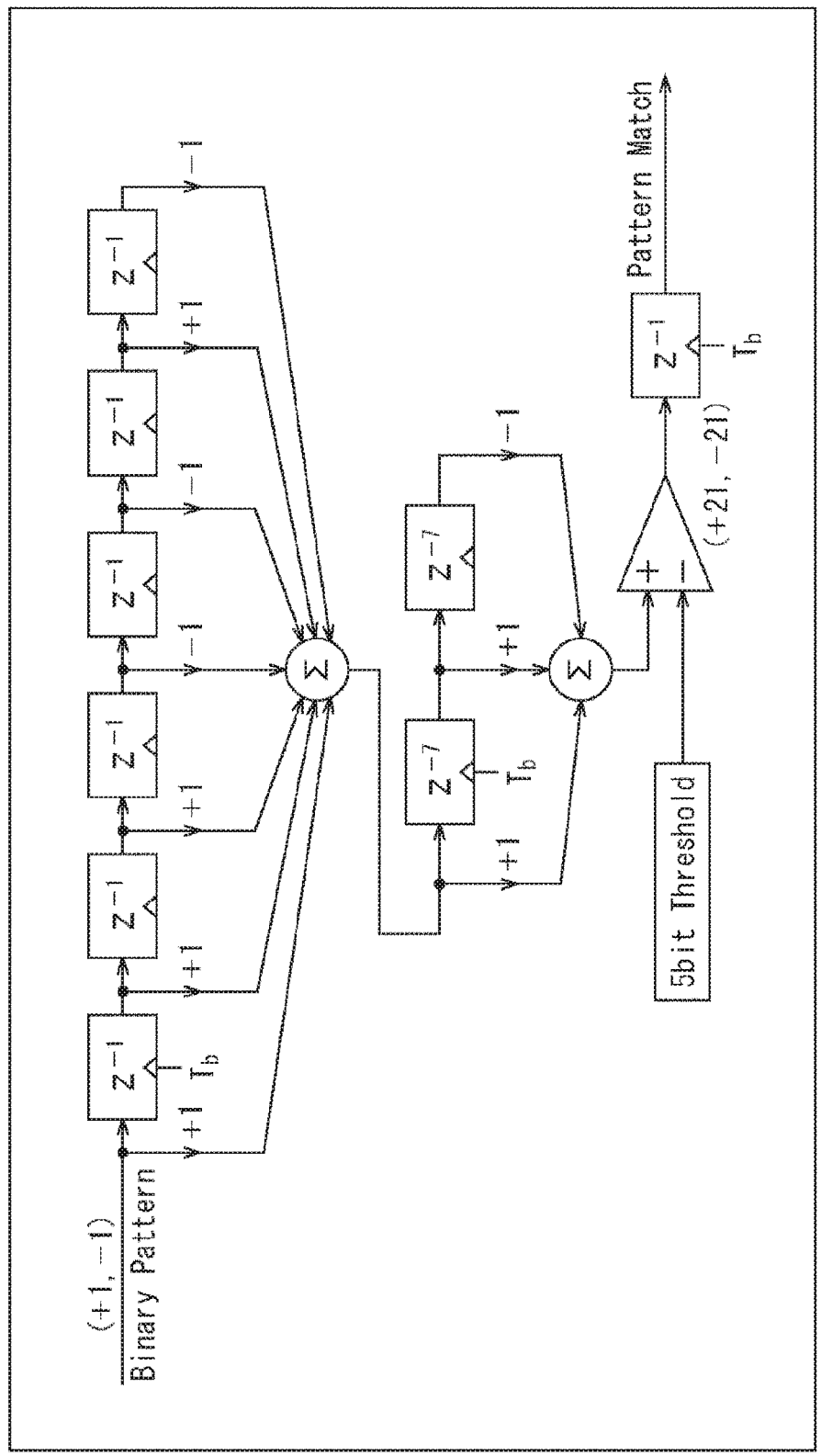
FIG. 5 is a diagram illustrating a configuration of a frame synchronization device.

FIG. 5 is a diagram illustrating a configuration example of a frame synchronization device that performs frame synchronization on the basis of the above-described preamble.

FIG. 5 illustrates a configuration of a device that performs frame synchronization on the basis of a preamble in which the frame synchronization signal sequence B is [−a a a], where a is represented by [1 1 1 −1 −1 1 −1]. The configuration of the frame synchronization device illustrated in FIG. 5 is disclosed in Non-Patent Document 3.

The frame synchronization device in FIG. 5 calculates cross correlation between a received signal sequence input with +1 or −1 as an element and a, and performs threshold determination for an additional value of every seven times up to fourteen times prior to the cross correlation. The frame synchronization device performs the frame synchronization by determining a time when the additional value exceeds the threshold as a reception time of the last symbol of the frame synchronization signal sequence B.

Figure 6:
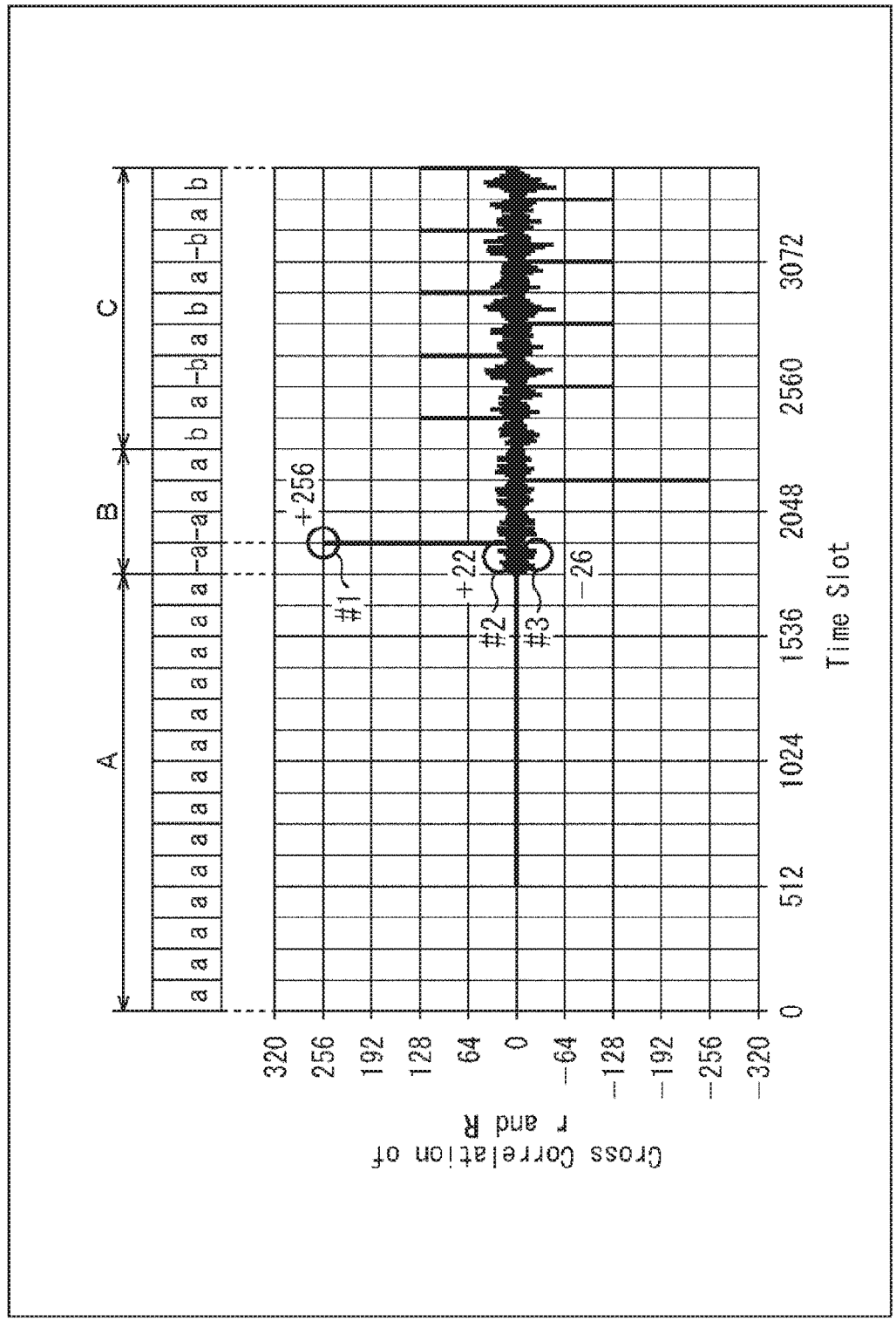
FIG. 6 is a diagram illustrating cross correlation characteristics between a received signal and a reference sequence in IEEE 802.15.3c.
Figure 7:
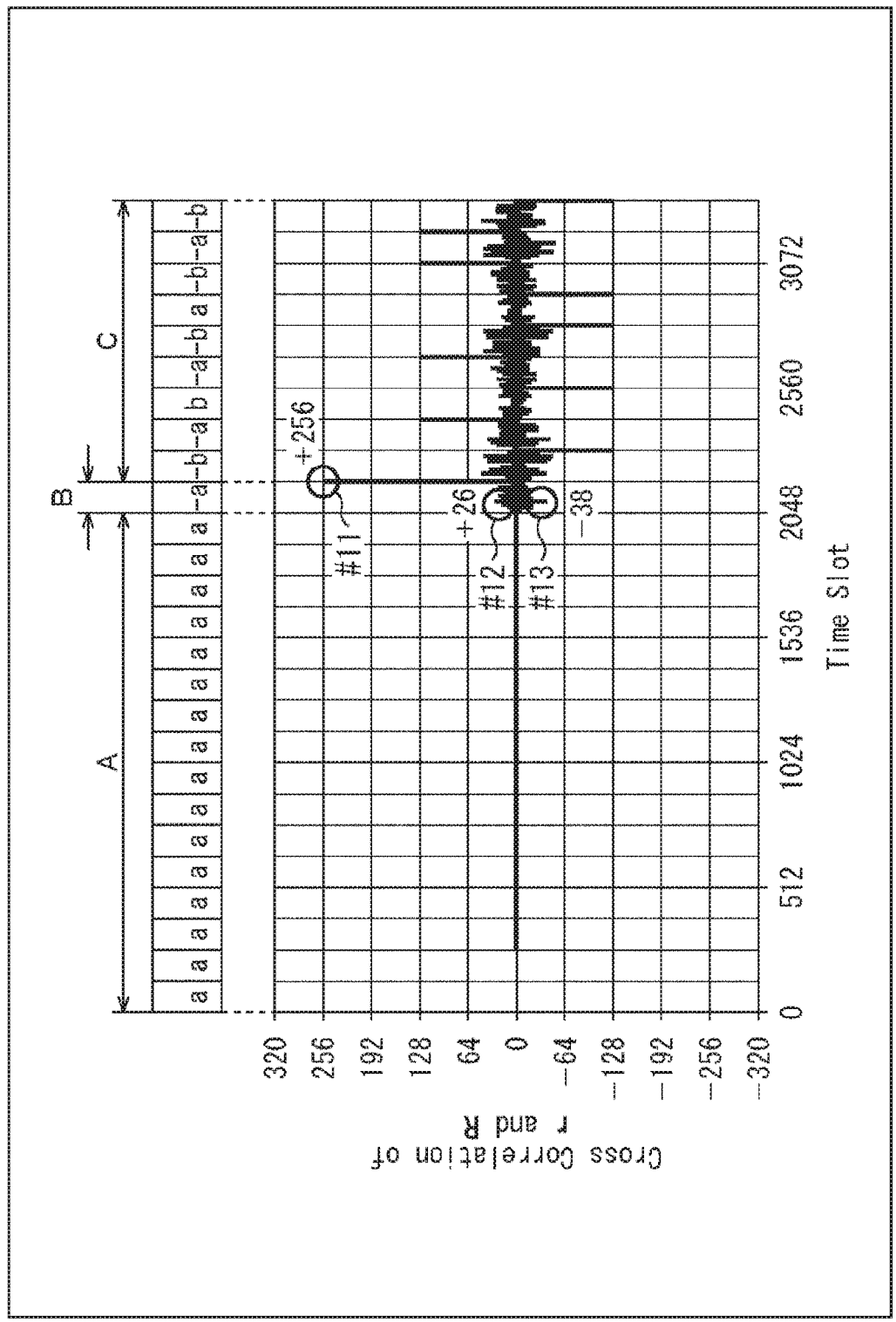
FIG. 7 is a diagram illustrating cross correlation characteristics between a received signal and a reference sequence in IEEE 802.11ad.

FIGS. 6 and 7 illustrate cross correlation characteristics between a noiseless received signal and a reference sequence R, where the reference sequence R for frame synchronization is set to [a −a] in the respective cases of IEEE 802.15.3c and IEEE 802.11ad. The horizontal axis represents the time slot (the bit length from the head), and the vertical axis represents the cross correlation value.

The frame synchronization device performs the frame synchronization by determining the positions (times) of the peaks of the cross correlation values illustrated by the circles #1 and #11 as the positions of the last symbol of −a that is the lead sequence of the frame synchronization signal sequence B.

Here, when noise is added to the received signal, the peak level of the cross correlation value decreases, and the level of a side lobe generated outside the peak position increases. As a result, there is a possibility of erroneous detection in which a wrong position is determined as a synchronization position when the frame synchronization is performed by threshold determination or peak detection of the cross correlation value.

Therefore, it is desirable that the level of the side lobe be as small as possible. As described above, since the GCSs a and b of IEEE 802.15.3c and the GCSs a and b of IEEE 802.11ad are different signal sequences, the level of the side lobe is different between IEEE 802.15.3c and IEEE 802.11ad. As illustrated by the circles #2 and #3 in FIG. 6, the maximum value of an absolute value of the side lobe level is detected as 26 in IEEE 802.15.3c. Further, as illustrated by the circles #12 and #13 in FIG. 7, the maximum value of an absolute value of the side lobe level is detected as 38 in the IEEE 802.11.ad, <2-3. GCS Definition and GCS Generation Method>

Here, an example of GCS definition and GCS generation method will be described. The definition of GCS is described in Non-Patent Document 4, and a GCS generation method is described in Non-Patent Document 5.

GCS is defined as a sequence that satisfies the following expressions (1) to (3), where respective i-th elements of GCSs a and b of a sequence length L are a(i) and b(i) (1≤i≤L) (Non-Patent Document 4). [Expression 1]

$$c(j) + d(j) = \begin{cases} 0 & \text{for } j \neq 0 \\ 2L & \text{for } j = 0 \end{cases} \quad (1)$$

[Expression 2]

$$c(j) = \sum_{i=1}^{L-j} a(i)a(i+j) \quad (2)$$

[Expression 3]

$$d(j) = \sum_{i=1}^{L-j} b(i)b(i+j) \quad (3)$$

It is known that GCS can be generated by the following expressions (4) to (7), where $L=2^n$ (n is an integer) (Non-Patent Document 5).

[Expression 4]

$$a_0(i)=\delta(i) \quad (4)$$

[Expression 5]

$$b_0(i)=\delta(i) \quad (5)$$

[Expression 6]

$$a_n(i)=a_{n-1}(i)+W_n b_{n-1}(i-D_n) \quad (6)$$

[Expression 7]

$$b_n(i)=a_{n-1}(i)-W_n b_{n-1}(i-D_n) \quad (7)$$

In the expressions (4) and (5), $\delta(i)$ is the Kronecker delta function. Further, n, the delay vector D, and the weight vector W are expressed by the following expressions (8) to (10).

[Expression 8]

$$n \in \{1, \ldots, N\} \quad (8)$$

[Expression 9]

$$D=[D_1, D_2, \ldots, D_n, \ldots, D_N] \quad (9)$$

[Expression 10]

$$W=[W_1, W_2, \ldots, W_n, \ldots, W_N] \quad (10)$$

Furthermore, in a case where GCSs a and b are Binary GCS, the delay vector D is an arbitrary combination of {1, 2, 4, . . . , $2^{N-1}$}, and $W_n$ is +1 or −1.

The expressions (4) to (7) mean that GCSs a and b can be connected to generate GCS of a length of n-th power of 2.

Further, for example, Patent Document 1 proposes a technique of generating an extended GCS from GCSs a and b, using a Hadamard matrix, and constituting a preamble, using the generated extended GCS.

<2-4. Channel Estimation>

Next, channel estimation using the channel estimation signal sequence C included in the preamble will be described. Channel estimation is described in Non-Patent Document 6, for example.

Figure 8:
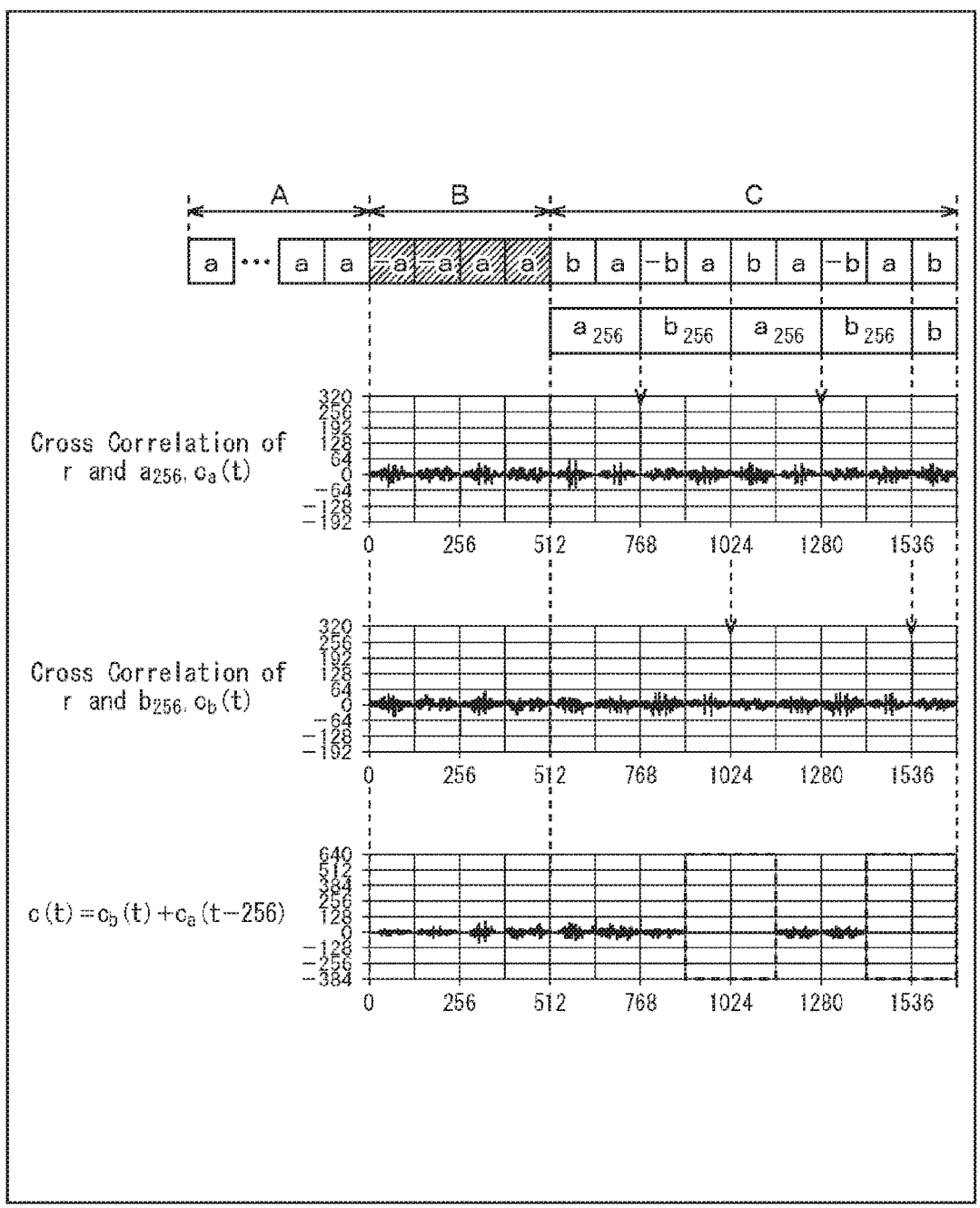
FIG. 8 is a diagram illustrating a concept of channel estimation using a preamble of IEEE 802.15.3c.

FIG. 8 is a diagram illustrating a concept of the channel estimation described in Non-Patent Document 6.

The preamble illustrated in the upper part of FIG. 8 is the preamble of IEEE 802.15.3c illustrated in A of FIG. 3. In a case of performing the channel estimation using the preamble of IEEE 802.15.3c, the receiving-side device calculates cross correlation $c_a(t)$ between [b a] ($a_{256}$) that is connection of GCSs a and b and the received signal at time t. Further, the receiving-side device calculates cross correlation $c_b(t)$ between [−b a] ($b_{256}$) that is connection of GCSs a and b and the received signal at time t. The upper graph of the three graphs illustrated in FIG. 8 illustrates the cross correlation $c_a(t)$ between $a_{256}$ and the received signal r, and the middle graph illustrates the cross correlation $c_b(t)$ between $b_{256}$ and the received signal r.

Further, the receiving-side device obtains cross correlation c(t) by adding $c_b(t)$ and a 256 symbol delay value $c_a(t-256)$ of $c_a(t)$. c(t) is expressed by the following expression (11).

[Expression 11]

$$c(t)=c_b(t)+c_a(t-256) \quad (11)$$

The lower graph in FIG. 8 illustrates c(t). As illustrated in the lower graph in FIG. 8, peaks of the correlation value are detected at time t=1536 and at time t=1024 that is earlier than the time t=1536 by 512 times. As surrounded by the broken lines, the value of c(t) is 0 in the section of ±128 symbols centered on the peak position of the cross correlation, which has the same length as $a_{256}$ and $b_{256}$.

Further, the receiving-side device obtains a channel impulse response by adding c(t) and a 512 symbol delay value c(t−512) of c(t). By adding the correlation value at the time t=1024 to the correlation value at the time t=1536, the channel impulse response as illustrated in FIG. 9 is obtained.

Figure 9:
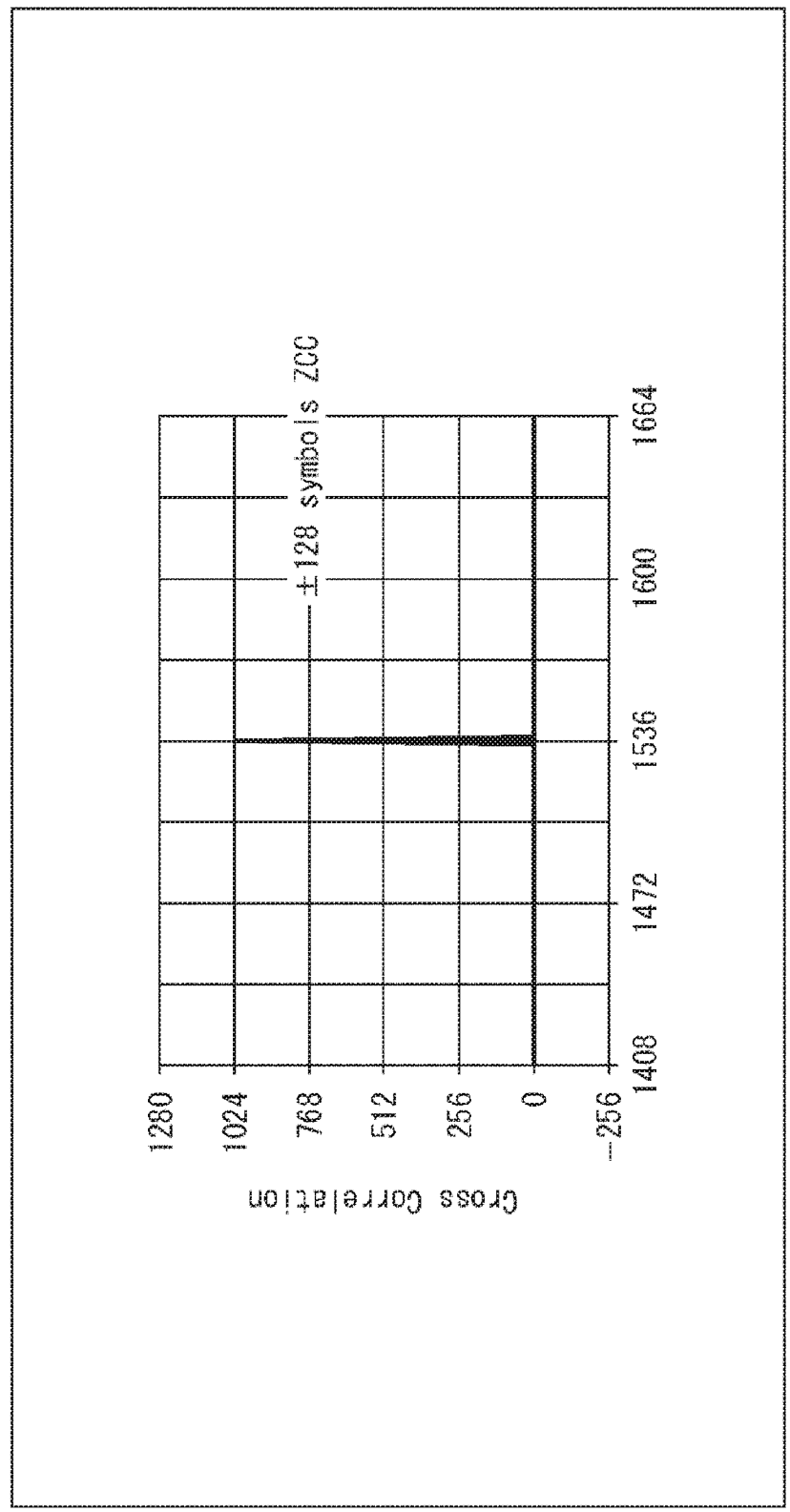
FIG. 9 is a diagram illustrating a channel impulse response using a preamble of IEEE 802.15.3c.

FIG. 9 is an enlarged view of a range of 128 symbols before and after the time t=1536 in the lower graph in FIG. 8.

In the channel estimation using the channel estimation signal sequence C of IEEE 802.15.3c, the section of zero-cross correlation (ZCC) of ±128 symbols with respect to the peak is realized. This illustrates that delay waves within ±128 symbols can be estimated with respect to the main wave (peak). Since c(t) of the two peaks is 512, the peak of a substantial main wave is represented by 1024 obtained by adding 512 and 512.

In a case where the peak of the main wave is set to the same value as a conventional case, it is desirable that a longer ZCC section can be obtained.

Figure 10:
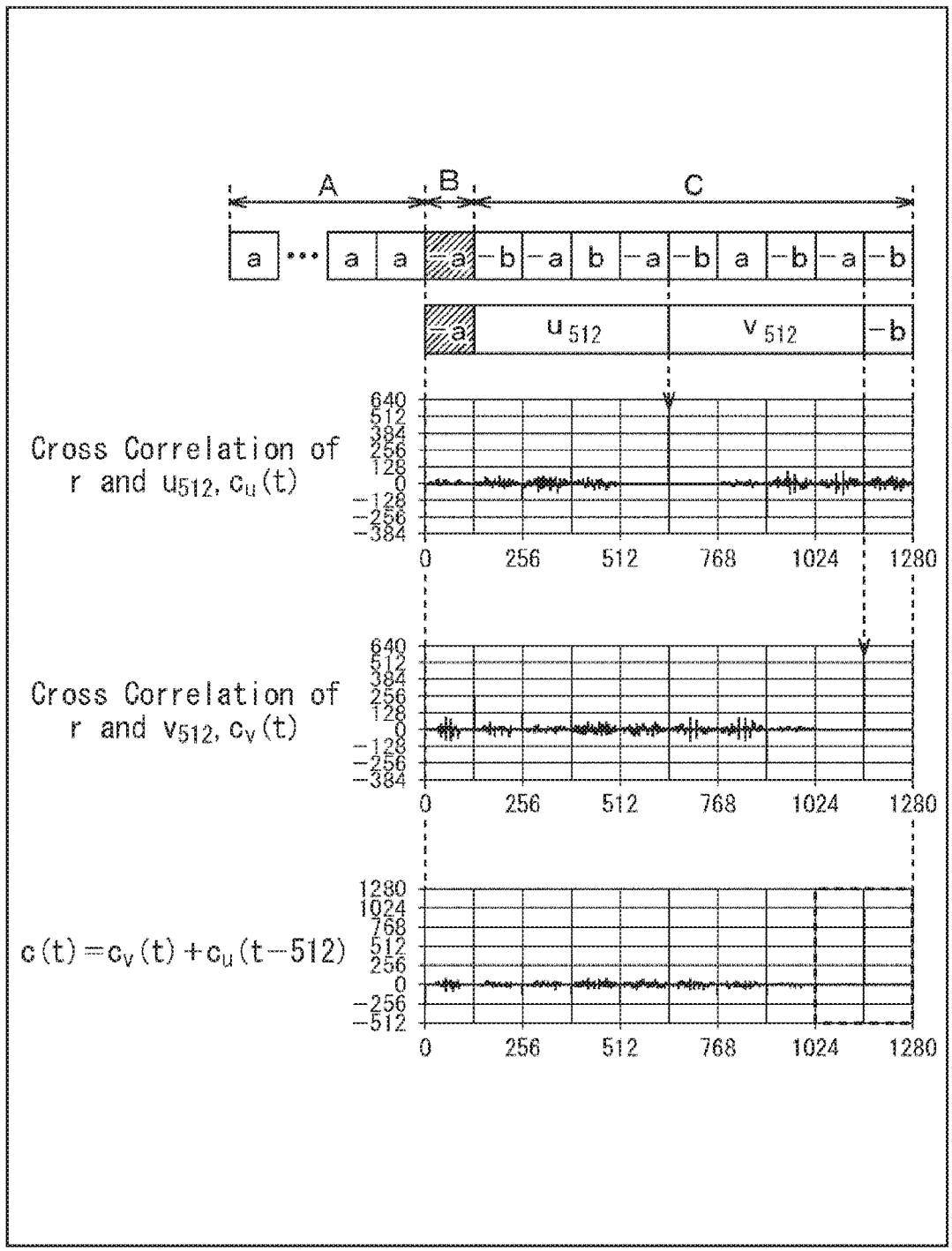
FIG. 10 is a diagram illustrating a concept of channel estimation using a preamble of IEEE 802.11ad.

FIG. 10 is a diagram illustrating a concept of channel estimation using the preamble of IEEE 802.11ad.

The preamble illustrated in the upper part in FIG. 10 is the preamble of IEEE 802.11ad illustrated in FIG. 4. In a case of performing the channel estimation using the preamble of IEEE 802.11ad, the receiving-side device calculates cross correlation $c_u(t)$ between [−b −a b −a] ($u_{512}$) that is connection of GCSs a and b and the received signal at the time t. Further, the receiving-side device calculates cross correlation $c_v(t)$ between [−b a −b −a] ($v_{512}$) that is connection of GCSs a and b and the received signal at the time t. The upper graph of the three graphs illustrated in FIG. 10 illustrates the cross correlation $c_u(t)$ between $u_{512}$ and the received signal r and the middle graph illustrates the cross correlation $c_v(t)$ between $v_{512}$ and the received signal r.

Further, the receiving-side device calculates cross correlation c(t) obtained by adding $c_v(t)$ and a 512 symbol delay value $c_u(t-512)$ of $c_u(t)$. The lower graph in FIG. 10 illustrates c(t). As illustrated in the lower graph in FIG. 10, the peak of the cross correlation is detected at time t=1152.

Although the lengths of $u_{512}$ and $v_{512}$ are 512 symbols, the ZCC section realized by the channel estimation using the channel estimation signal sequence C of IEEE 802.11ad is, as surrounded by the broken lines, a section of ±128 symbols with respect to the peak, similarly to the case of IEEE 802.15.3c. This is because $u_{512}$ and $v_{512}$ used for calculation of the cross correlation are not complementary sequences.

Figure 11:
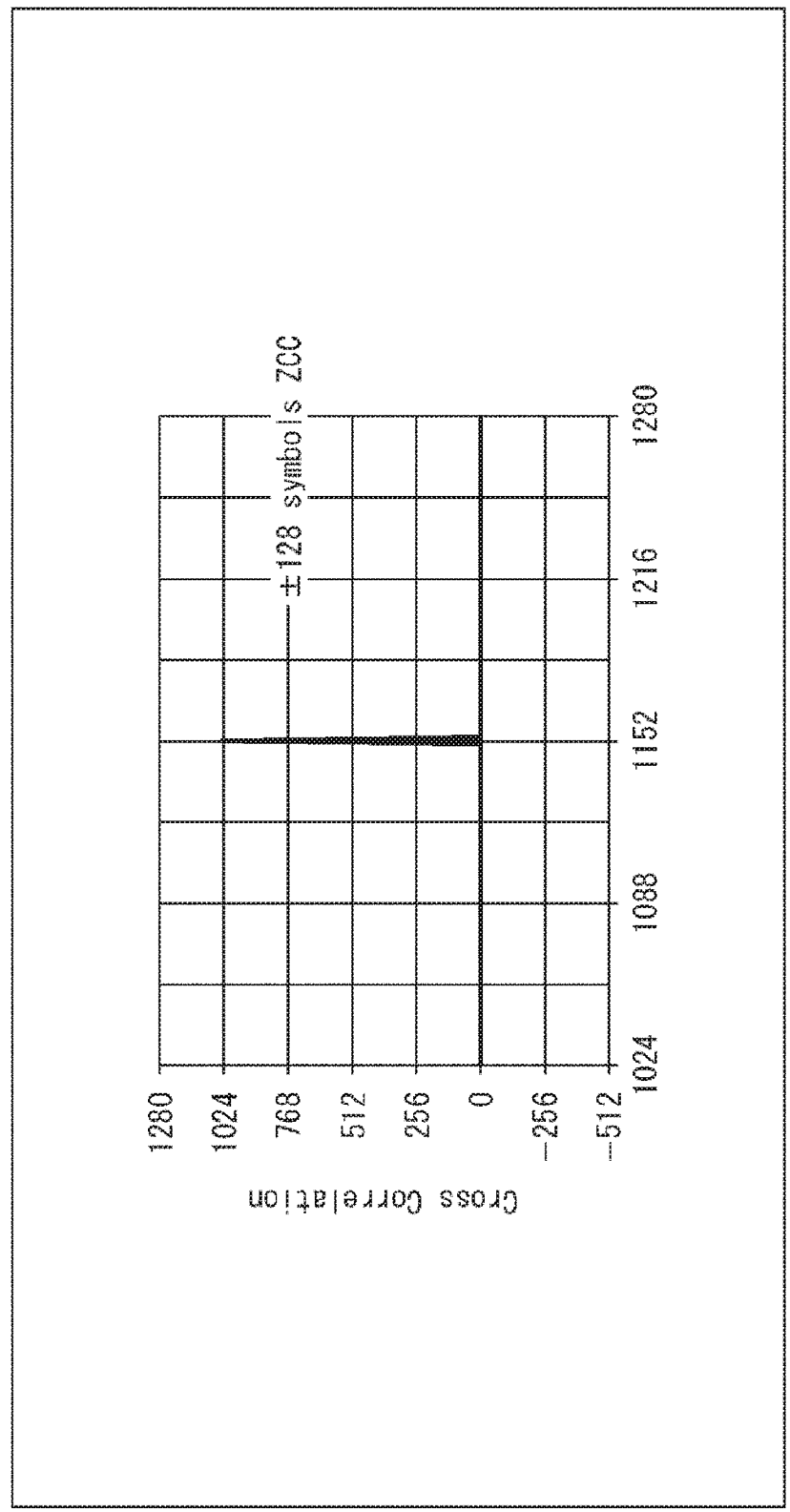
FIG. 11 is a diagram illustrating a channel impulse response using a preamble of IEEE 802.11ad.

By use of the channel estimation signal sequence C of IEEE 802.11ad, the channel impulse response of FIG. 11 in which the peak of the cross correlation peak is detected at the time t=1152 is obtained.

<<3. Concept of Preamble to which Present Technology is Applied>>

As described above, to improve synchronization performance, it is desirable that the level of the side lobe be as small as possible. In addition, it is desirable to obtain a longer ZCC section in order to improve channel estimation performance.

When substituting n−1 into n in the expressions (6) and (7), the expressions (6) and (7) respectively become the following expressions (12) and (13).

[Expression 12]

$$a_{n-1}(i)=a_{n-2}(i)+W_{n-1}b_{n-2}(i-D_{n-1}) \quad (12)$$

[Expression 13]

$$b_{n-1}(i)=a_{n-2}(i)-W_{n-1}b_{n-2}(i-D_{n-1}) \quad (13)$$

When substituting the expression (12) into the expression (6) and the expression (13) into the expression (7), $a_n(i)$ and $b_n(i)$ are respectively expressed by the following expressions (14) and (15).

[Expression 14]

$$a_n(i)=a_{n-2}(i)+W_{n-1}b_{n-2}(i-D_{n-1})+W_n a_{n-2}(i-D_n)-W_n W_{n-1}b_{n-2}(i-D_{n-1}-D_n) \quad (14)$$

[Expression 15]

$$b_n(i)=a_{n-2}(i)+W_{n-1}b_{n-2}(i-D_{n-1})-W_n a_{n-2}(i-D_n)+W_n W_{n-1}b_{n-2}(i-D_{n-1}-D_n) \quad (15)$$

In a case where the bit lengths of $a_{n-2}$ and $b_{n-2}$ that are GCS are 128 bits of $2^7$ (n=7), an with elements expressed by the expression (14) including the two $a_{n-2}$ terms and two $b_{n-2}$ terms is GCS with a 512-bit length. Similarly, $b_n$ with elements expressed by the expression (15) including the two $a_{n-2}$ terms and two $b_{n-2}$ terms is GCS with a 512-bit length.

Since $a_n$ and $b_n$ are complementary sequences, for example, GCS $a_n$ and $b_n$ with a 512-bit length that is quadruple length is configured from the GCS with a 128-bit length, and are used as a part of the channel estimation signal sequence C, thereby to realize the ZCC section of ±256 symbols.

The channel estimation signal sequence C having the preamble to which the present technology is applied is a sequence partly including any of a total of sixteen sequences of [a b a −b a b −a b], [a b −a b a b a −b], [a −b a b a −b −a −b], and [a −b −a −b a −b a b], illustrated in FIG. 12, inverted sequences of the aforementioned four sequences, and reverse sequences of the aforementioned eight sequences. Hereinafter, [a b a −b a b −a b], [a b −a b a b a −b], [a −b a b a −b −a −b], and [a −b −a −b a −b a b] are referred to as basic sequences in the sense that other sequences are sequences added to before and after the aforementioned sequences as the basis.

$a_{n-2}$ and $b_{n-2}$ in FIG. 12 are 128-bit GCS, and when $a_{n-2}$ is represented by a and $b_{n-2}$ is represented by b, the above four basic sequences are obtained.

[a b a −b a b −a b] that is the first basic sequence is GCS in a case where the weight vector W is represented by [+1 +1], and the first half [a b a −b] corresponds to $a_n$ and the following [a b −a b] corresponds to $b_n$. [a b −a b a b a −b] that is the second basic sequence is GCS in a case where the weight vector W is represented by [+1-1], and the first half [a b −a b] corresponds to $a_n$ and the following [a b a −b] corresponds to $b_n$.

[a −b a b a −b −a −b] that is the third basic sequence is GCS in a case where the weight vector W is represented by [−1 +1], and the first half [a −b a b] corresponds to $a_n$ and the following [a −b −a −b] corresponds to $b_n$. [a −b −a −b a −b a b] that is the fourth basic sequence is GCS in a case where the weight vector W is represented by [−1 −1], and the first half [a −b −a −b] corresponds to $a_n$ and the following [a −b a b] corresponds to $b_n$.

Note that the inverted sequence is a sequence in which +/− are exchanged, and the reverse sequence is a sequence in which the order is rearranged from right to left.

To be specific, the channel estimation signal sequence C is one of the following sixteen sequences.

(1) [−a b a b a −b a b −a b a b]
(2) [a −b a b −a b a b a −b a b]
(3) [−a −b a −b a b a −b −a −b a −b]
(4) [a b a −b −a −b a −b a b a −b]
(5) [a −b −a −b −a b −a −b a −b −a −b]
(6) [−a b −a −b a −b −a −b −a b −a −b]
(7) [a b −a b −a −b −a b a b −a b]
(8) [−a −b −a b a b −a b −a −b −a b]
(9) [b a b −a b a −b a b a b −a]
(10) [b a −b a b a b −a b a b −a]
(11) [−b a −b −a −b a b a −b a −b −a]
(12) [−b a b a −b a −b −a −b a b a]
(13) [−b −a −b a −b −a b −a −b −a −b a]
(14) [−b −a b −a −b −a −b a −b −a b −a]
(15) [b −a b a b −a −b −a b −a b a]
(16) [b −a −b −a b −a b a b −a −b −a]

The sequence (1) is a sequence obtained by adding [−a b] to before and [a b] to after [a b a −b a b −a b] that is the first basic sequence.

The sequence (2) is a sequence obtained by adding [a −b] to before and [a b] to after [a b −a b a b a −b] that is the second basic sequence.

The sequence (3) is a sequence obtained by adding [−a −b] to before and [a −b] to after [a −b a b a −b −a −b] that is the third basic sequence.

The sequence (4) is a sequence obtained by adding [a b] to before and [a −b] to after [a −b −a −b a −b a b] that is the fourth basic sequence.

The sequences (5) to (8) are inverted sequences of the sequences (1) to (4), respectively. The sequences (9) to (16) are reverse sequences of the sequences (1) to (8), respectively.

Note that, as will be described below, the frame synchronization signal sequence B of the preamble to which the present technique is applied is configured from GCSs a and b, or one GCS that is an inverted sequence of GCSs a and b, and the one GCS may be shared as the lead one GCS of the channel estimation signal sequence C.

In the case of sharing, the sequences in which the lead one GCS is the GCS a, of the above-described sequences (1) to (16), are used in a case where the frame synchronization signal sequence B is configured from the GCS a. Further, the sequences in which the lead one GCS is the GCS −a are used in a case where the frame synchronization signal sequence B is configured from the GCS −a. Similarly, the sequences in which the lead one GCS is the GCS b are used in a case where the frame synchronization signal sequence B is configured from the GCS b, and the sequences in which the lead one GCS is the GCS −b are used in a case where the frame synchronization signal sequence B is configured from the GCS −b.

<<4. Transmission System>>

Figure 13:
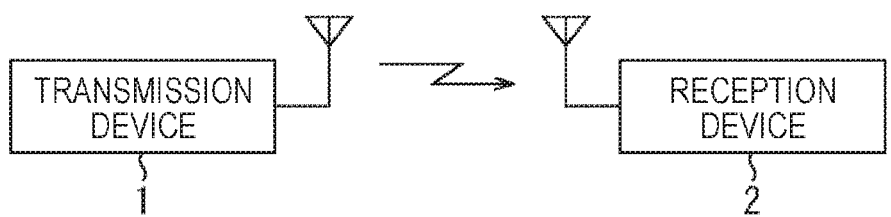
FIG. 13 is a diagram illustrating a configuration example of a transmission system according to an embodiment of the present technology.

FIG. 13 is a diagram illustrating a configuration example of a transmission system according to an embodiment of the present technology.

The transmission system in FIG. 13 is configured from a transmission device 1 and a reception device 2.

The transmission device 1 applies processing such as error correction coding, insertion of header/preamble, modulation, and the like to data to be transmitted. In the transmission system in FIG. 13, data transmission is performed in units of frames having the configuration in FIG. 1. Each frame includes the preamble having the configuration in FIG. 2. The transmission device 1 processes various types of data such as audio visual (AV) as the data to be transmitted.

The transmission device 1 transmits data obtained through application of various types of processing to the reception device 2 by wireless communication using a predetermined frequency band such as the 60 GHz band.

The reception device 2 applies demodulation processing to a received signal and performs frame synchronization using the preamble. Further, the reception device 2 performs the channel estimation using the preamble, performs equalization processing, and then applies processing such as error correction, thereby to acquire the data to be transmitted.

<<5. Preamble to Which Present Technology is Applied>>

<5-1. Preamble Configuration>

Figure 14:
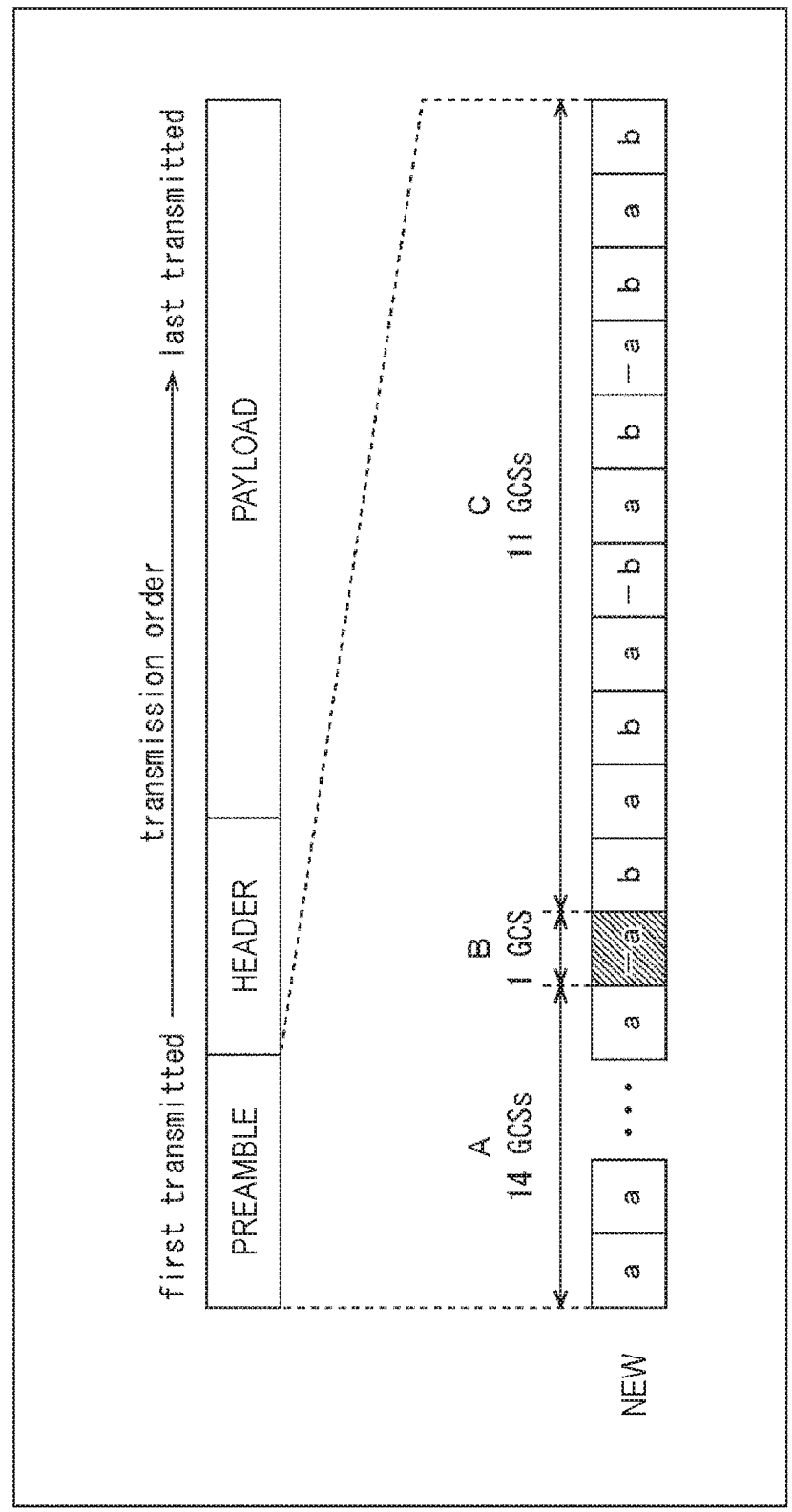
FIG. 14 is a diagram illustrating a configuration example of a preamble to which the present technology is applied.

FIG. 14 is a diagram illustrating a configuration example of a preamble to which the present technology is applied. Hereinafter, the preamble to which the present technology is applied is referred to as new preamble as appropriate.

The new preamble is configured from GCSs a and b of a length of 128 symbols, and GCSs −a and −b that are bit inverted sequences of GCSs a and b, similarly to the preamble of IEEE 802.15.3c and IEEE 802.11ad. The GCSs a and b constituting the new preamble are different from the GCSs a and b constituting the preambles of IEEE 802.15.3c and IEEE 802.11ad.

In the example of FIG. 14, the frame detection signal sequence A is configured from fourteen times of iteration of GCS a. The number of iteration is arbitrary. Further, the frame synchronization signal sequence B following the frame detection signal sequence A is configured from the GCS −a.

It is also possible that the frame detection signal sequence A is configured from iteration of the GCS −a, instead of the iteration of the GCS a. In a case where the frame detection signal sequence A is configured from the iteration of the GCS −a, the frame synchronization signal sequence B is configured from the GCS a. Further, it is also possible that the frame detection signal sequence A is configured from the iteration of the GCS b. In a case where the frame detection signal sequence A is configured from the iteration of the GCS b, the frame synchronization signal sequence B is configured from the GCS −b. It is also possible that the frame detection signal sequence A is configured from iteration of the GCS −b. In a case where the frame detection signal sequence A is configured from the iteration of the GCS −b, the frame synchronization signal sequence B is configured from the GCS b.

In the example of FIG. 14, the channel estimation signal sequence C is configured from [−a b a b a −b a b −a b a b], including the GCS −a of the frame synchronization signal sequence B shared as the lead GCS of the channel estimation signal sequence C. The configuration of the new preamble illustrated in FIG. 14 is a configuration in a case of using the sequence (1) out of the sixteen sequences, as the channel estimation signal sequence C.

One of the sequences (1) to (16) is used as the channel estimation signal sequence C constituting the new preamble, as illustrated in FIG. 14. Note that ii is also possible to share a part of the channel estimation signal sequence C as the GCS constituting the frame synchronization signal sequence B.

Figure 15:
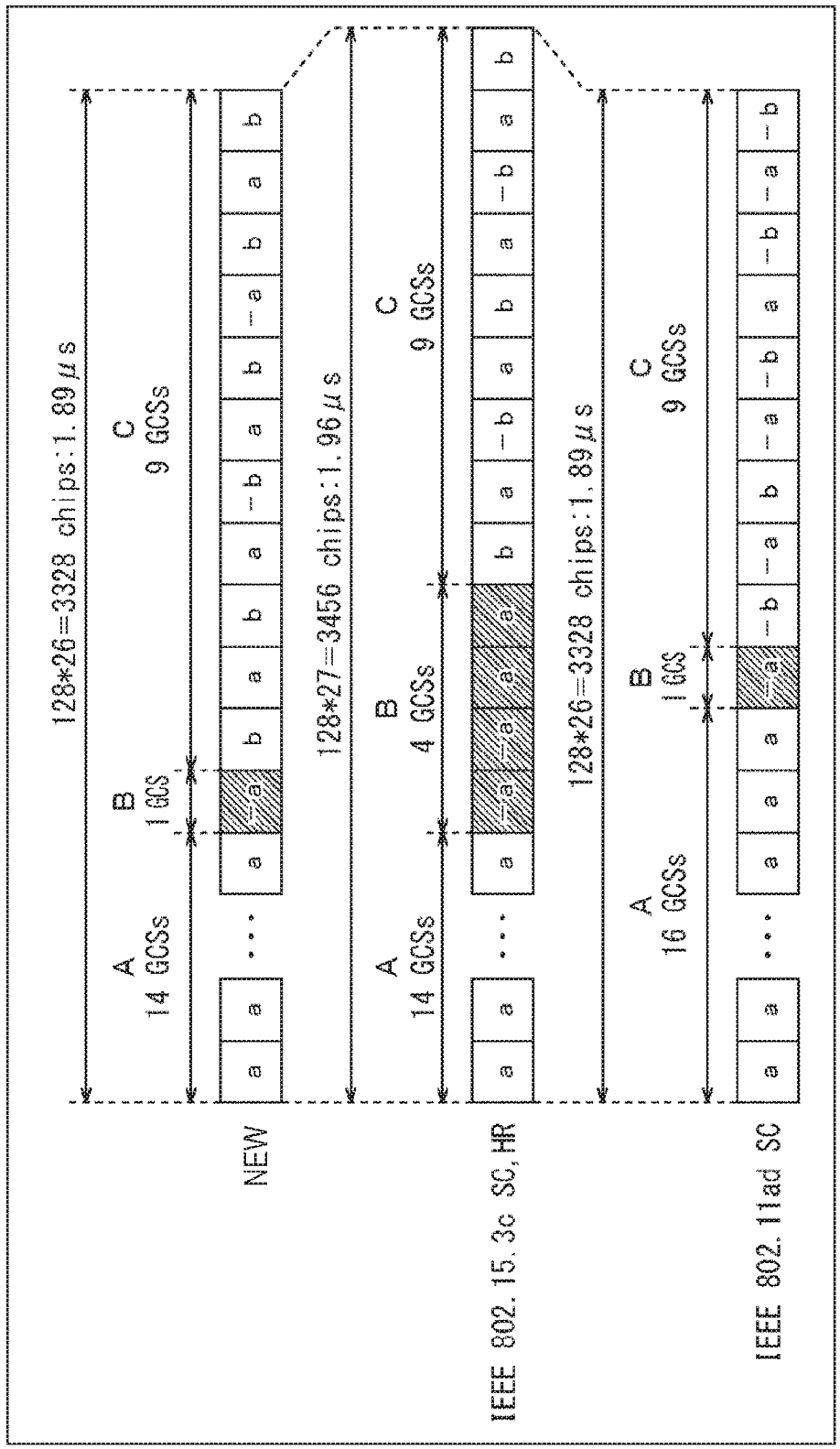
FIG. 15 is a diagram illustrating a length of a preamble to which the present technology is applied.

FIG. 15 is a diagram illustrating the length of the new preamble.

As illustrated in FIG. 15, the total length of the new preamble is the same as the length of the preamble of IEEE 802.11ad, and is shorter than the length of the preamble of IEEE 802.15.3c by one GCS.

<5-2. GCSs a and b>

FIG. 16 is a diagram illustrating examples of GCSs a and b of a sequence length of 128, which constitutes the new preamble.

As illustrated in FIG. 16, the GCS a is expressed in binary notation as follows.

$$\begin{bmatrix} +1 & -1 & +1 & -1 & -1 & +1 & -1 & +1 & -1 & +1 & -1 & +1 & -1 & +1 & -1 & +1 \\ -1 & +1 & +1 & -1 & -1 & +1 & +1 & -1 & +1 & -1 & -1 & +1 & -1 & +1 & +1 & -1 \\ +1 & +1 & -1 & -1 & -1 & -1 & +1 & +1 & -1 & -1 & +1 & +1 & -1 & -1 & +1 & +1 \\ -1 & -1 & -1 & -1 & -1 & -1 & -1 & -1 & +1 & +1 & +1 & +1 & -1 & -1 & -1 & -1 \\ -1 & -1 & -1 & -1 & +1 & +1 & +1 & +1 & +1 & +1 & +1 & +1 & +1 & +1 & +1 & +1 \\ +1 & +1 & -1 & -1 & +1 & +1 & -1 & -1 & -1 & +1 & +1 & +1 & +1 & -1 & -1 \\ -1 & +1 & +1 & -1 & +1 & -1 & -1 & +1 & +1 & -1 & -1 & +1 & -1 & +1 & -1 & +1 \\ +1 & -1 & +1 & -1 & +1 & -1 & +1 & -1 & -1 & +1 & -1 & +1 & +1 & -1 & +1 & -1 \end{bmatrix}$$

Further, the GCS a is A5556696C33300F00FFFCC3C6999AA5A in hexadecimal notation.

The GCS b is expressed in binary notation as follows.

$$\begin{bmatrix} +1 & -1 & +1 & -1 & -1 & +1 & -1 & +1 & -1 & +1 & -1 & +1 & -1 & +1 & -1 & +1 \\ -1 & +1 & +1 & -1 & -1 & +1 & +1 & -1 & +1 & -1 & -1 & +1 & -1 & +1 & +1 & -1 \\ +1 & +1 & -1 & -1 & -1 & -1 & +1 & +1 & -1 & -1 & +1 & +1 & -1 & -1 & +1 & +1 \\ -1 & -1 & -1 & -1 & -1 & -1 & -1 & -1 & +1 & +1 & +1 & +1 & -1 & -1 & -1 & -1 \\ +1 & +1 & +1 & +1 & -1 & -1 & -1 & -1 & -1 & -1 & -1 & -1 & -1 & -1 & -1 & -1 \\ -1 & -1 & +1 & +1 & -1 & -1 & +1 & +1 & +1 & +1 & -1 & -1 & -1 & -1 & +1 & +1 \\ +1 & -1 & -1 & +1 & -1 & +1 & +1 & -1 & -1 & +1 & +1 & -1 & -1 & +1 & +1 & -1 \\ -1 & +1 & -1 & +1 & -1 & +1 & -1 & +1 & +1 & -1 & +1 & -1 & +1 & -1 & +1 \end{bmatrix}$$

Further, GCS b is A5556696C33300F0F00033C3966655A5 in hexadecimal notation.

In the bit sequences illustrated in FIG. 16, the upper left bit is a bit to be transmitted first and the lower right bit is a bit to be transmitted last. Bits on the right are sequentially transmitted starting from the upper left bit, and when the rightmost bit in a certain row is transmitted, bits are sequentially transmitted from the leftmost bit in the next row.

FIG. 17 is a diagram illustrating the weight vector W and the delay vector D for generating GCSs a and b constituting a new preamble.

The GCSs a and b in FIG. 16 are generated by applying the weight vector W [−1, −1, −1, +1, +1, −1, −1] and the delay vector D [8, 4, 16, 2, 32, 1, 64] to the expressions (6) and (7).

Note that FIG. 17 illustrates the weight vector W and the delay vector D used to generate the GCS constituting the preambles of IEEE 802.15.3c and IEEE 802.11ad.

Figure 18:
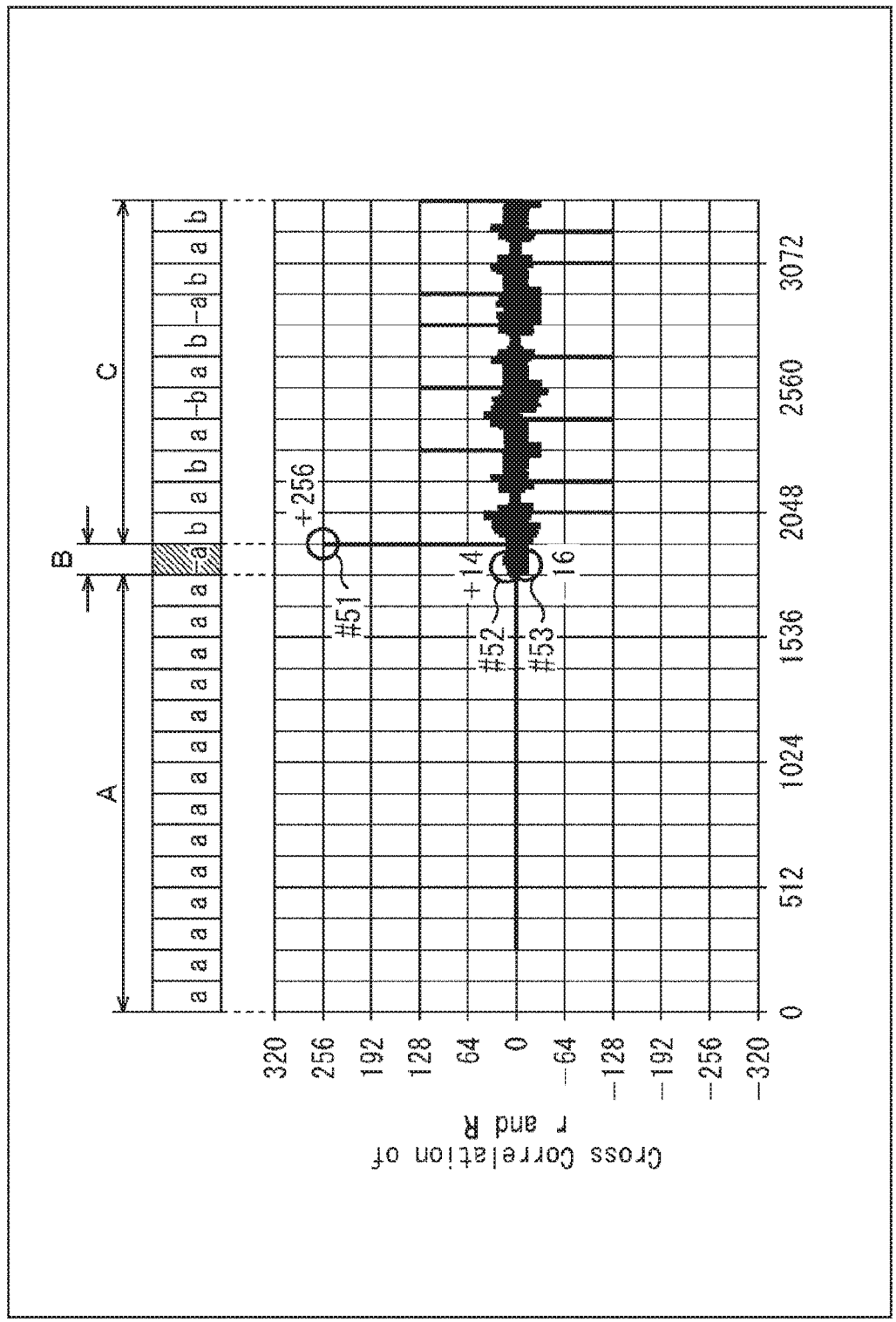
FIG. 18 is a diagram illustrating a side lobe reduction effect in a case of using a new preamble.

FIG. 18 is a diagram illustrating a side lobe reduction effect in a case where a new preamble is used.

FIG. 18 is a diagram illustrating cross correlation characteristics between the noiseless received signal and the reference sequence R when the reference sequence R for frame synchronization is set to [a −a] for the new preamble.

As illustrated by the circles #52 and #53 in FIG. 18, the side lobe is detected before the peak of the cross correlation, and the maximum value of the absolute value is 16. The side lobe level in the case of using the new preamble is 38% lower than the maximum value (26) of the absolute value of the side lobe level of IEEE 802.15.3c described with reference to FIG. 6, and is 58% lower than the maximum value (38) of the absolute value of the side lobe level of IEEE 802.11ad, as described with reference to FIG. 7.

That is, by use of the new preamble, the side lobe level can be reduced and synchronization performance can be improved.

As in the reception device 2, the cross correlation value between the received signal and [a −a] is obtained, for example. Further, the frame synchronization is performed by determining the time of the peak of the cross correlation value circled by the circle #51, which exceeds the threshold, as the reception time of the last symbol of the GCS −a, which is the signal sequence of the frame synchronization signal sequence B.

Figure 19:
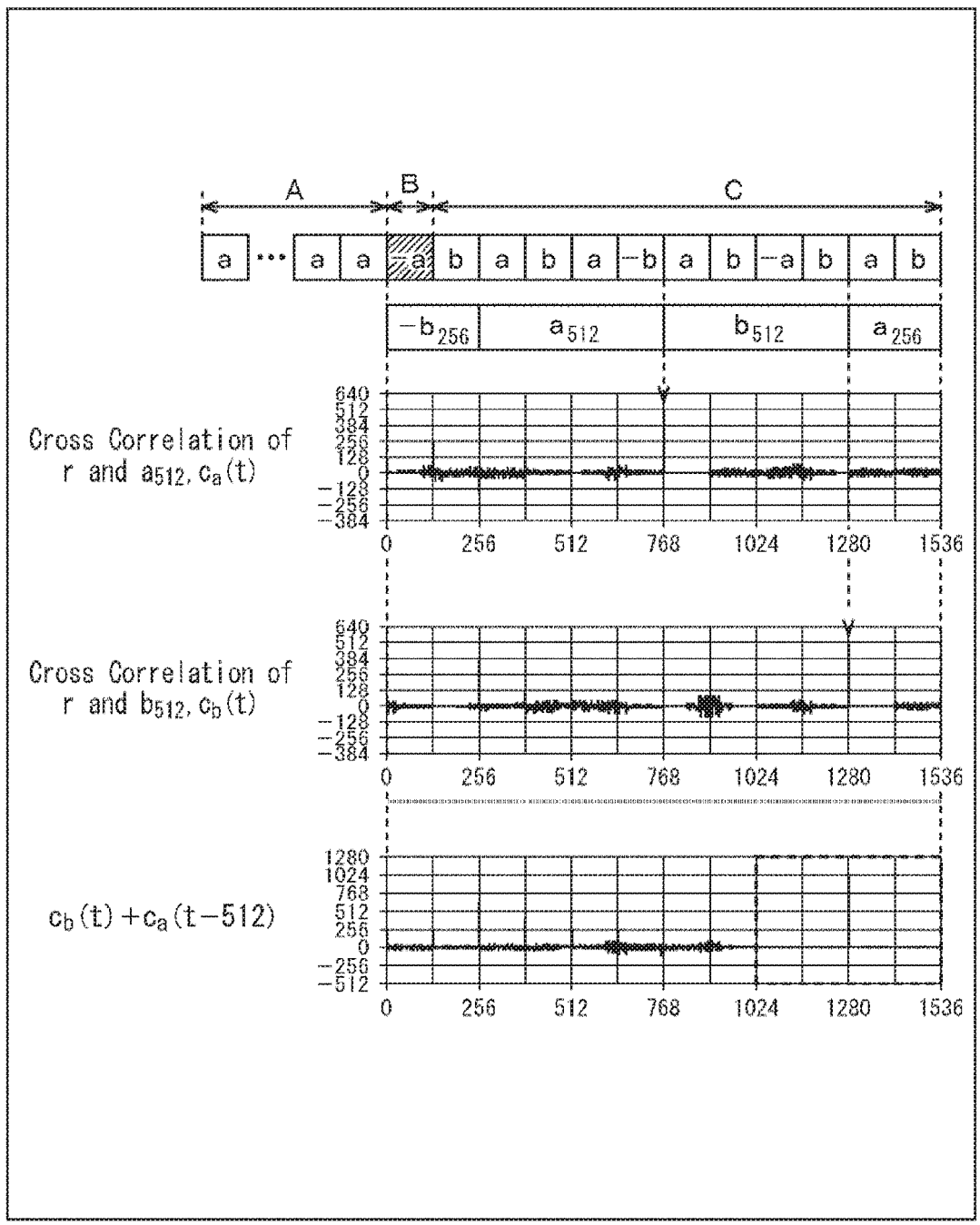
FIG. 19 is a diagram illustrating a concept of channel estimation using a new preamble.

FIG. 19 is a diagram illustrating a concept of channel estimation using a new preamble.

In a case of performing the channel estimation using a new preamble, the reception device 2 calculates the cross correlation $c_a(t)$ between [a b a −b] ($a_{512}$) that is connection of the GCSs a and b and the received signal at the time t. Further, the reception device 2 calculates the cross correlation $c_b(t)$ between [a b −a b] ($b_{512}$) that is connection of the GCSs a and b and the received signal at the time t. The upper graph of the three graphs illustrated in FIG. 19 illustrates the cross correlation $c_a(t)$ between $a_{512}$ and the received signal r, and the middle graph illustrates the cross correlation $c_b(t)$ between $b_{512}$ and the received signal r. $a_{512}$ is the first four signal sequences of the eight signal sequences constituting the first basic sequence and $b_{512}$ is the last four signal sequences of the eight signal sequences constituting the first basic sequence.

Further, the reception device 2 calculates c(t) obtained by adding $c_b(t)$ and a 512 symbol delay value $c_a(t-512)$ of $c_a(t)$. The lower graph in FIG. 19 illustrates c(t). As illustrated in the lower graph in FIG. 19, the peak of the correlation value is detected at the time t=1280. The reception device 2 performs channel estimation using the cross correlation value surrounded by the broken lines as the channel impulse response.

Figure 20:
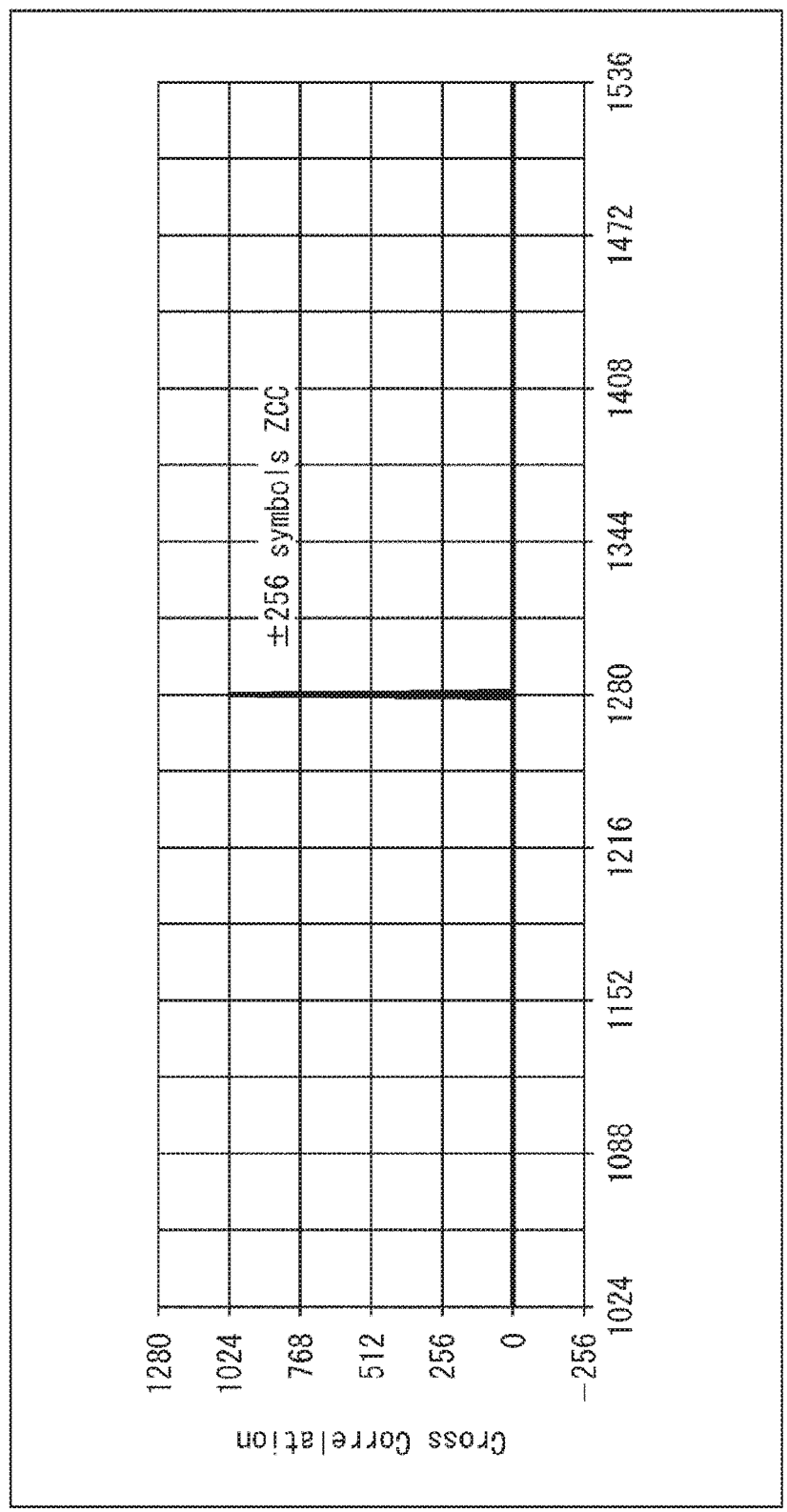
FIG. 20 is a diagram illustrating a channel impulse response using a new preamble.

FIG. 20 is an enlarged view of a range of 256 times before and after the time t=1280 in the lower graph in FIG. 19.

As illustrated in FIG. 20, in the channel estimation using the channel estimation signal sequence C of the new preamble, the ZCC section of ±256 symbols is realized with respect to the peak. This illustrates that delay waves within ±256 symbols can be estimated with respect to the main wave.

That is, by use of the new preamble, the ZCC section can be doubled as compared with the case of using the preamble of IEEE 802.15.3c or IEEE 802.11ad, and the channel estimation performance can be improved. As described with reference to FIGS. 9 and 11, the ZCC section in the preamble of IEEE 802.15.3c or IEEE 802.11ad is a section of ±128 symbols with respect to the peak.

Note that $a_{512}$ and $b_{512}$ used for calculating the cross correlation with the received signal at the time of channel estimation are switched by the channel estimation signal sequence C. $a_{512}$ is the first four signal sequences of the eight signal sequences constituting the basis sequence included in the channel estimation signal sequence C and $b_{512}$ is the last four signal sequences of the eight signal sequences constituting the basic sequence included in the channel estimation signal sequence C.

For example, in a case where the second basic sequence [a b −a b a b a −b] is included in the channel estimation signal sequence C, the channel estimation is performed using [a b −a b] that is the first four signal sequences as $a_{512}$ and [a b a −b] that is the last four signal sequences following the first four as $b_{512}$.

Figure 21:
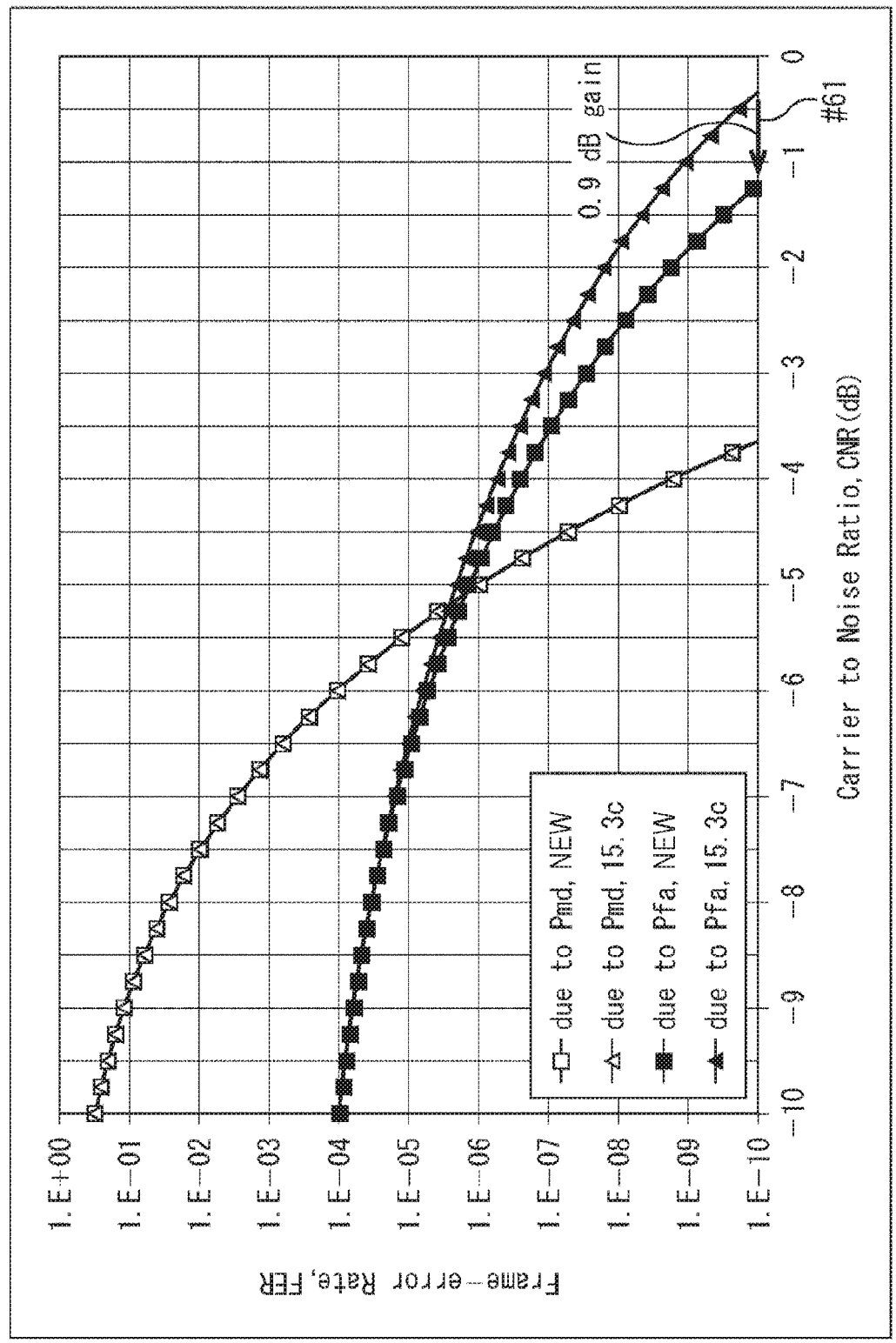
FIG. 21 is a diagram illustrating an effect in a case of using a new preamble.

FIG. 21 is a diagram illustrating the effect in the case of using a new preamble.

FIG. 21 illustrates carrier to noise ratio (CNR) dependency of a frame error rate when the reference sequence R for frame synchronization is set to [a −a]. In FIG. 21, the vertical axis represents the frame error rate and the horizontal axis represents CNR. The frame error rate includes missed detection probability and false alarm probability. The missed detection probability is a probability that a frame cannot be detected, and the false alarm probability is a probability that a wrong position is detected as a frame position. Note that a frame synchronization determination threshold is 80.

The open squares represent the missed detection probability of the frame in the case of using the new preamble and the open triangles represent the missed detection probability of the frame in the case of IEEE 802.15.3c. Since the peak value of the cross correlation is unchanged between the case of using the new preamble and the case of IEEE 802.15.3c, there is no difference in the missed detection probability of the frame.

Meanwhile, the filled squares represent the false alarm probability of the frame position in the case of using the new preamble and the filled triangles represent the false alarm probability of the frame position in the case of IEEE 802.15.3c. Compared with the case of using the preamble of IEEE 802.15.3c, as indicated by the arrow #61, gain improvement of 0.9 dB can be realized for the false alarm probability.

<<6. Configurations and Operations of Devices>>
<6-1. Configurations of Devices>

Next, configurations of the transmission device 1 and the reception device 2 constituting the transmission system in FIG. 13 will be described.

Figure 22:
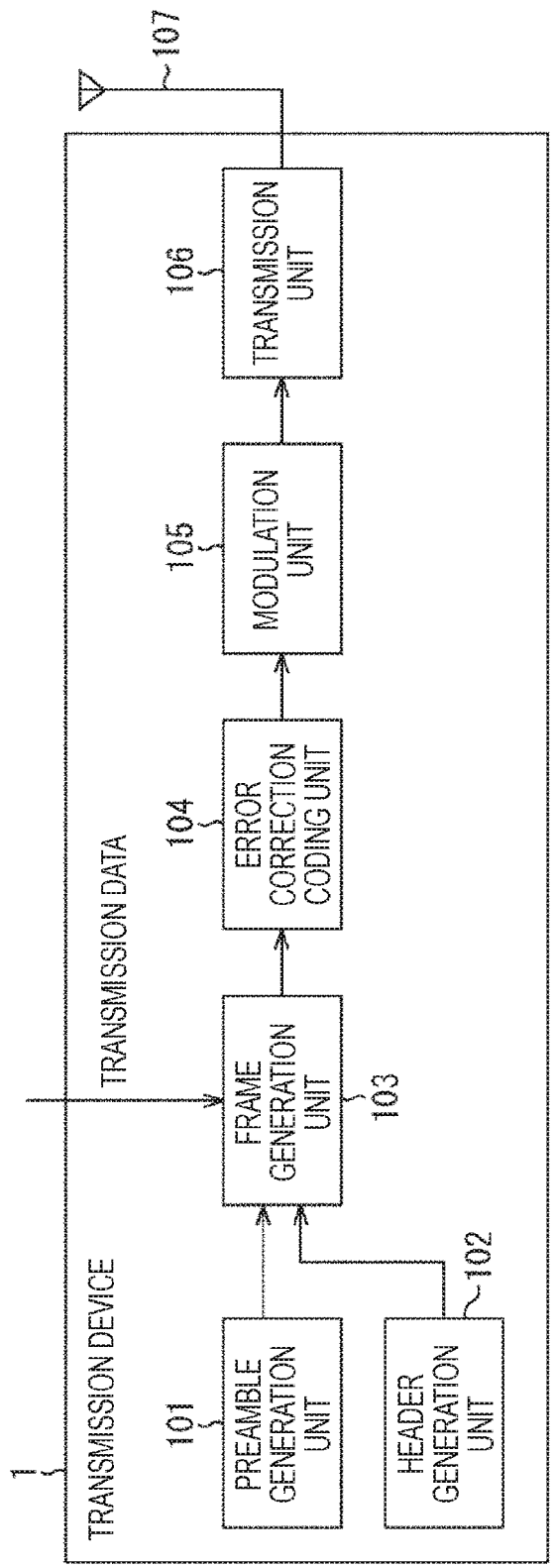
FIG. 22 is a block diagram illustrating a configuration example of a transmission device.

FIG. 22 is a block diagram illustrating a configuration example of the transmission device 1.

The transmission device 1 includes a preamble generation unit 101, a header generation unit 102, a frame generation unit 103, an error correction coding unit 104, a modulation unit 105, a transmission unit 106, and a transmission antenna 107.

The preamble generation unit 101 generates a new preamble having the configuration illustrated in FIG. 14, for example, and outputs the preamble to the frame generation unit 103.

The header generation unit 102 generates a header including information regarding error correction coding of payload data, a modulation method, and the like, and outputs the header to the frame generation unit 103.

The frame generation unit 103 generates a frame illustrated in FIG. 1 by adding the preamble supplied from the preamble generation unit 101 and the header supplied from the header generation unit 102 to the payload for transmission data, and outputs the frame to the error correction coding unit 104.

The error correction coding unit 104 performs error correction coding of the data supplied from the frame generation unit 103 according to a predetermined method, and outputs the data after error correction coding to the modulation unit 105.

The modulation unit 105 modulates the data after correction coding supplied from the error correction coding unit 104 according to a predetermined method, and outputs a signal sequence of transmission symbols to the transmission unit 106.

The transmission unit 106 applies various types of processing such as D/A conversion and band limiting to the signal sequence supplied from the modulation unit 105, converts the analog baseband signal into an RF signal, and transmits the RF signal from the transmission antenna 107.

Figure 23:
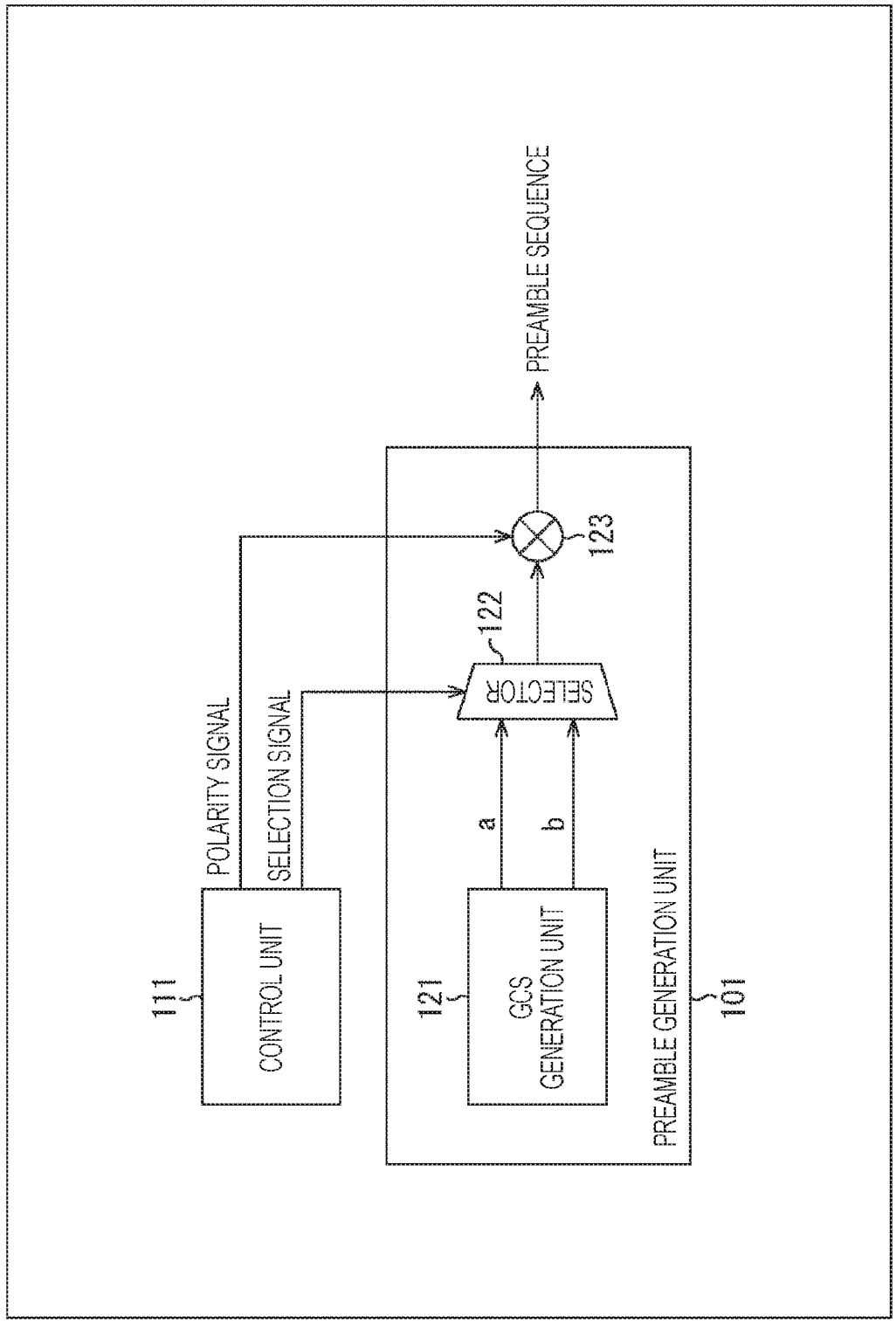
FIG. 23 is a block diagram illustrating a configuration example of a preamble generation unit in FIG. 22.

FIG. 23 is a block diagram illustrating a configuration example of the preamble generation unit 101 in FIG. 22.

The preamble generation unit 101 includes a GCS generation unit 121, a selector 122, and a multiplier 123. Operations of the selector 122 and the multiplier 123 are controlled by a control unit 111 not illustrated in FIG. 22.

The control unit 111 outputs a selection signal to the selector 122 and a polarity signal to the multiplier 123 according to the structure of the new preamble. The selection signal is a signal indicating which one of the GCS a and the GCS b is to be selected. The polarity signal is a signal indicating which one of +1 and −1 is to be multiplied with respect to the sequence selected by the selector 122.

The GCS generation unit 121 generates and outputs the GCS a and the GCS b constituting the new preamble.

For example, the GCS generation unit 121 reads the GCSs a and b generated in advance from internal RAM, ROM, or register, and outputs the GCSs a and b. Alternatively, the GCS generation unit 121 generates and outputs the GCSs a and b by applying the delay vector D and the weight vector W to expressions (6) and (7).

The selector 122 selects one of the GCSs a and b supplied from the GCS generation unit 121 according to the selection signal supplied from the control unit 111, and sequentially outputs the GCS.

The multiplier 123 multiplies the signal sequence supplied from the selector 122 by +1 or −1 according to the polarity signal supplied from the control unit 111, and outputs a signal sequence of the new preamble.

Figure 24:
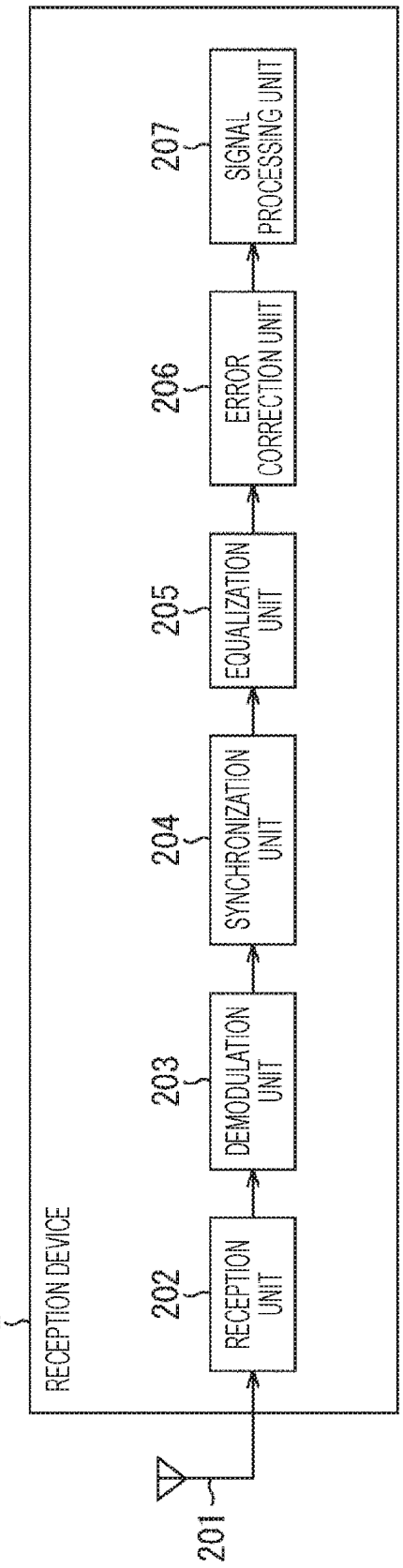
FIG. 24 is a block diagram illustrating a configuration example of a reception device.

FIG. 24 is a block diagram illustrating a configuration example of the reception device 2.

The reception device 2 includes a reception antenna 201, a reception unit 202, a demodulation unit 203, a synchronization unit 204, an equalization unit 205, an error correction unit 206, and a signal processing unit 207. The transmission signal transmitted from the transmission device 1 is received by the reception antenna 201 and is input to the reception unit 202 as an RF signal.

The reception unit 202 converts the RF signal supplied from the reception antenna 201 into an analog baseband signal, applies various types of processing such as signal level adjustment, band limiting, and A/D conversion, and outputs the processed signal.

The demodulation unit 203 demodulates the reception symbol according to a demodulation method corresponding to the modulation method in the transmission device 1, and outputs the signal sequence of the reception symbol. The signal sequence output from the demodulation unit 203 is supplied to the synchronization unit 204.

The synchronization unit 204 obtains cross correlation between the signal sequence supplied from the demodulation unit 203 and [a −a], for example, and performs frame synchronization as described with reference to FIG. 18. The synchronization unit 204 outputs a signal representing the reception time (position) of the last bit of the last symbol constituting the frame synchronization signal sequence B.

The equalization unit 205 performs channel estimation using the channel estimation signal sequence C, and applies equalization processing to the signal supplied from the demodulation unit 203, as described with reference to FIG. 19. The equalization unit 205 outputs data of the header and the payload obtained by performing the equalization processing to the error correction unit 206.

The error correction unit 206 performs error correction of the data supplied from the equalization unit 205, and outputs error-corrected data.

The signal processing unit 207 acquires error-corrected data transmitted from the transmission device 1, and performs processing. For example, in a case where the data to be transmitted is AV data, the signal processing unit 207 outputs AV data to a display device (not illustrated) and displays a video on the display, and outputs audio from a speaker.

<6-2. Operations of Devices>

Figure 25:
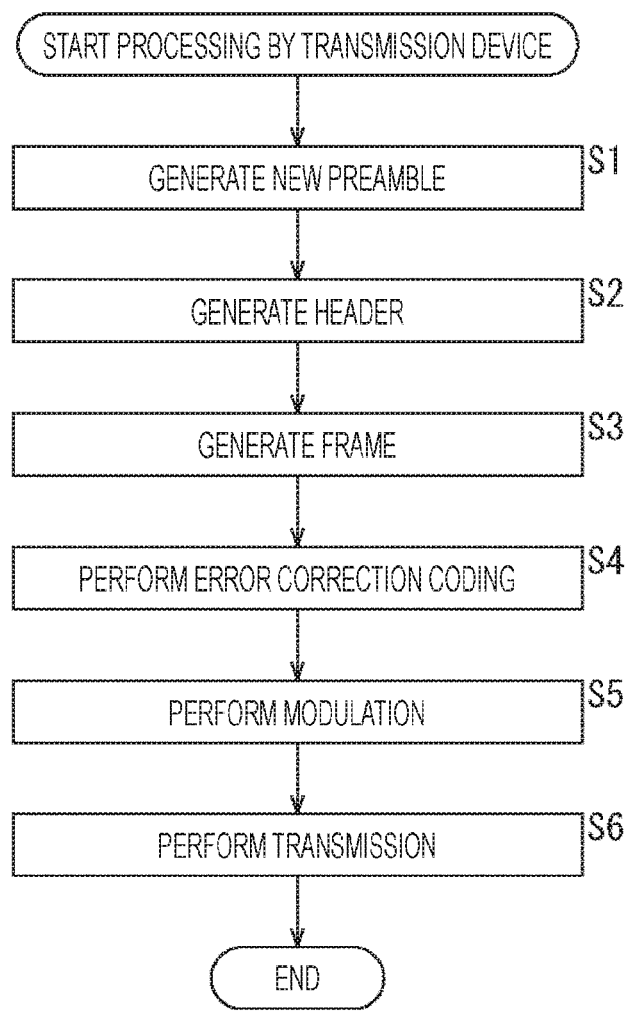
FIG. 25 is a flowchart illustrating transmission processing of a transmission device.

Here, transmission processing of the transmission device 1 will be described with reference to the flowchart of FIG. 25.

In step S1, the preamble generation unit 101 generates a new preamble having the configuration of FIG. 14, for example.

In step S2, the header generation unit 102 generates a header including information regarding error correction coding of payload data, a modulation method, and the like.

In step S3, the frame generation unit 103 generates a frame by adding the preamble generated by the preamble generation unit 101 and the header generated by the header generation unit 102 to the payload for transmission data.

In step S4, the error correction coding unit 104 performs error correction coding of the data supplied from the frame generation unit 103.

In step S5, the modulation unit 105 modulates the data after correction coding supplied from the error correction coding unit 104, and outputs a signal sequence of transmission symbols.

In step S6, the transmission unit 106 applies the processing such as D/A conversion and band limiting to the signal sequence supplied from the modulation unit 105, converts the analog baseband signal into an RF signal, and transmits the RF signal from the transmission antenna 107.

The above processing is repeatedly performed while data to be transmitted is input to the transmission device 1.

Figure 26:
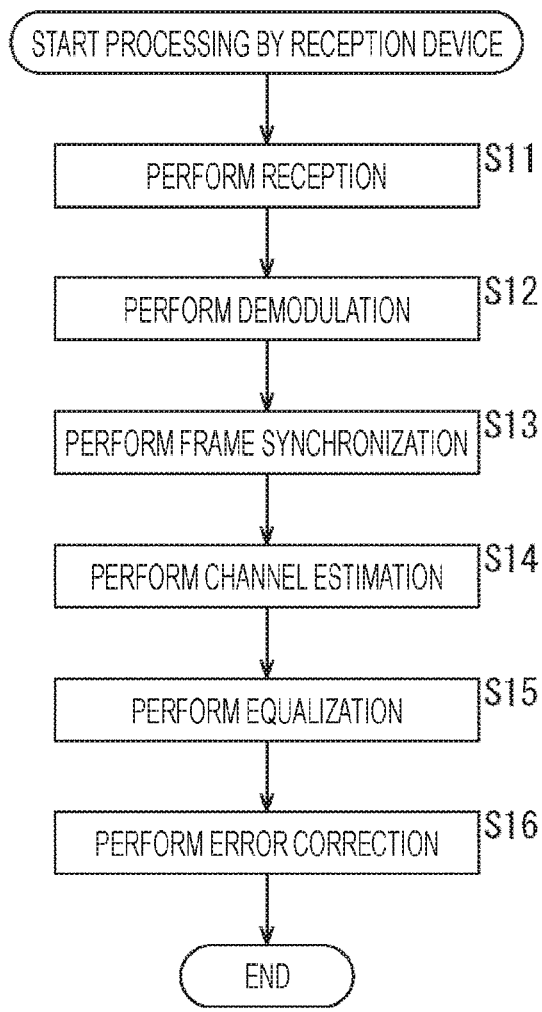
FIG. 26 is a flowchart illustrating reception processing of a reception device.

Next, reception processing of the reception device 2 will be described with reference to the flowchart in FIG. 26.

In step S11, the reception unit 202 of the reception device 2 converts the RF signal supplied from the reception antenna 201 into an analog baseband signal, applies various types of processing such as signal level adjustment, band limiting, and A/D conversion.

In step S12, the demodulation unit 203 demodulates the reception symbol according to a demodulation method corresponding to the modulation method in the transmission device 1, and outputs the signal sequence of the reception symbol.

In step S13, the synchronization unit 204 obtains cross correlation between the signal sequence supplied from the demodulation unit 203 and [a −a], for example, and performs frame synchronization as described with reference to FIG. 18. The synchronization unit 204 outputs a signal representing the reception time of the last bit of the last symbol constituting the frame synchronization signal sequence B.

In step S14, the equalization unit 205 performs channel estimation using the channel estimation signal sequence C, as described with reference to FIG. 19.

In step S15, the equalization unit 205 applies equalization processing to the signal sequence signal on the basis of a result of the channel estimation. The equalization unit 205 outputs data of the header and the payload obtained by performing the equalization processing to the error correction unit 206.

In step S16, the error correction unit 206 performs error correction of the data supplied from the equalization unit 205, and outputs error-corrected data.

Various types of processing are applied to the error-corrected data by the signal processing unit 207. The above processing is repeatedly performed while data transmitted from the transmission device 1 is received.

<<7. Method of Determining GCSs a and b>>

Here, a method of determining GCSs a and b will be described.

Figure 27:
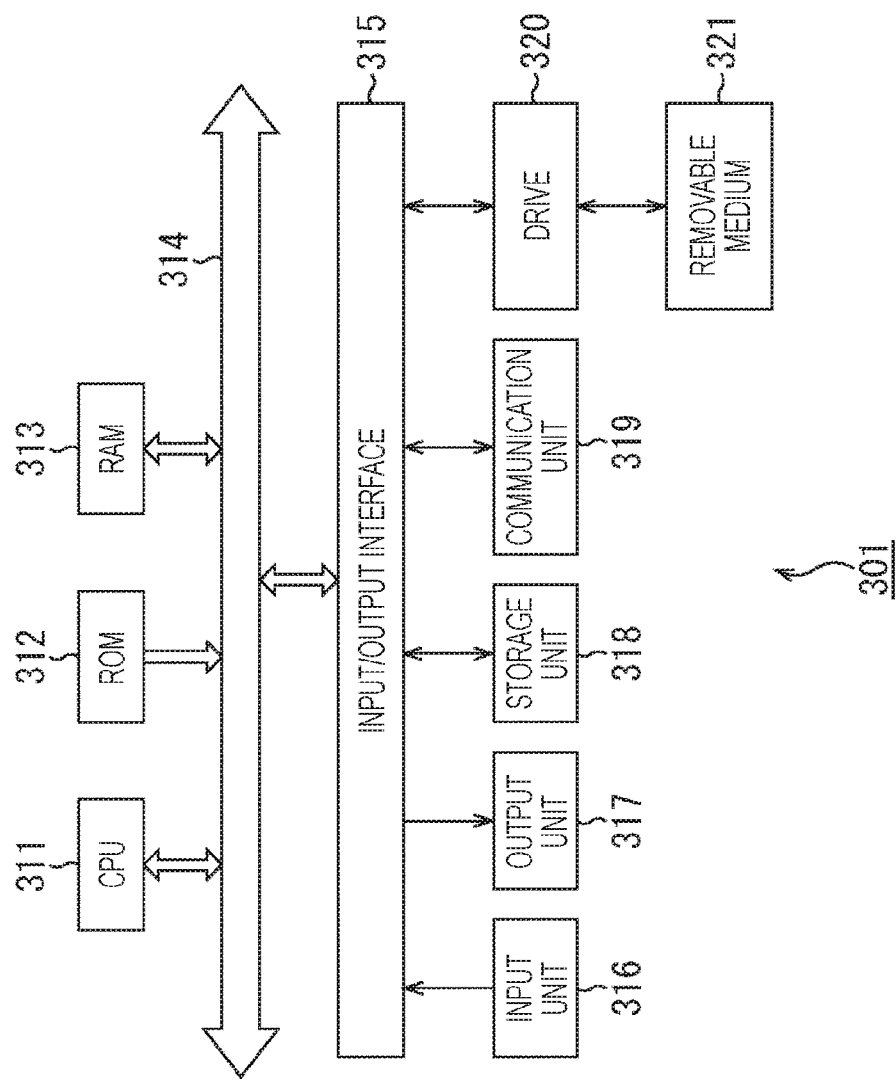
FIG. 27 is a block diagram illustrating a hardware configuration example of a computer.

FIG. 27 is a block diagram illustrating a hardware configuration example of a computer 301 for determining GCSs a and b. Selection of the GCSs a and b is performed in advance before data transmission.

A central processing unit (CPU) 311, a read only memory (ROM) 312, and a random access memory (RAM) 313 are mutually connected by a bus 314.

Further, an input/output interface 315 is connected to the bus 314. An input unit 316 including a keyboard, a mouse, and the like, and an output unit 317 including a display, a speaker, and the like are connected to the input/output interface 315. Further, a storage unit 318 including a hard disk, a nonvolatile memory, and the like, a communication unit 319 including a network interface and the like, and a drive 320 for driving a removable medium 321 are connected to the input/output interface 315.

Figure 28:
FIG. 28 is a block diagram illustrating a functional configuration example of the computer in FIG. 27.

FIG. 28 is a block diagram illustrating a functional configuration example of the computer 301 in FIG. 27.

At least a part of functional units illustrated in FIG. 28 is realized by executing a predetermined program by the CPU 311 in FIG. 27. In the computer 301, a signal sequence generation unit 341 and a signal sequence selection unit 342 are realized.

The signal sequence generation unit 341 generates a signal sequence as a candidate for the GCSs a and b, and outputs the signal sequence to the signal sequence selection unit 342.

The signal sequence selection unit 342 selects predetermined GCSs a and b from among the signal sequences generated by the signal sequence generation unit 341. The GCSs a and b selected by the signal sequence selection unit 342 are used for generation of a preamble.

Figure 29:
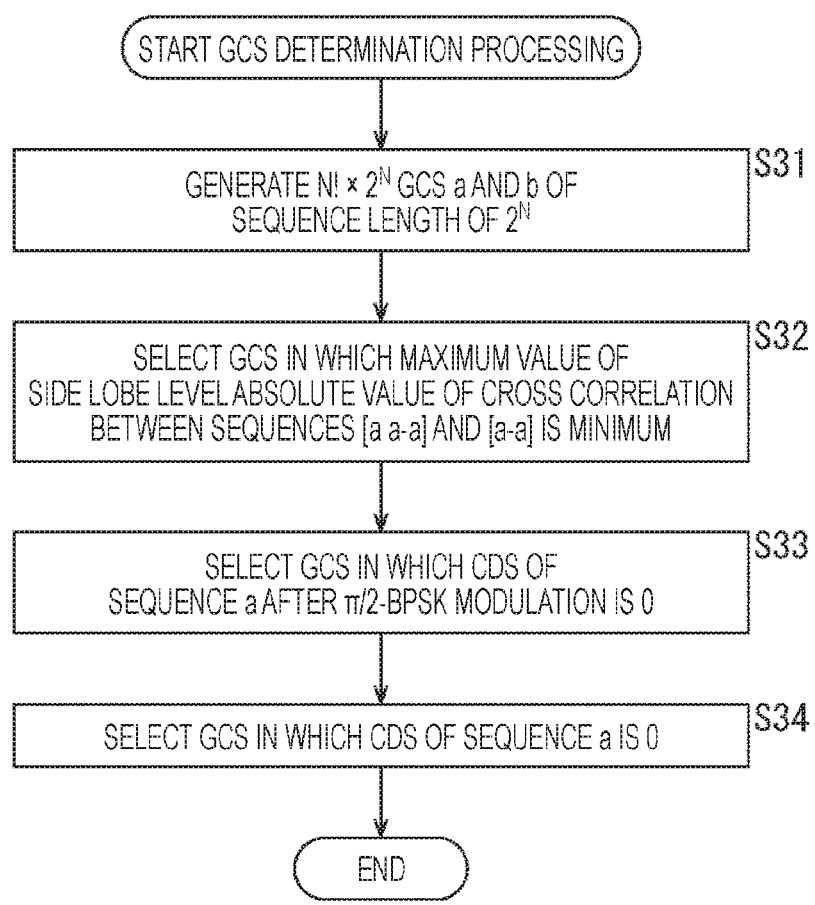
FIG. 29 is a flowchart for describing processing of a computer for determining GCSs a and b.

Processing of the computer 301 for determining GCSs a and b will be described with reference to FIG. 29.

In step S31, the signal sequence generation unit 341 generates $N! \times 2^N$ ways of all GCSs a and b with a sequence length $L=2^N$.

In step S32, the signal sequence selection unit 342 selects GCS in which the maximum value of the absolute value of the side lobe level of the cross correlation between the sequence [a a −a] and the sequence [a −a] is minimum, from among the GCS generated in step S31.

Since the side lobe appears only in an L symbol section just before the peak of the cross correlation, here, the cross correlation between the sequence [a a −a] and the sequence [a −a] is calculated and used for the selection of the GCS. Since the maximum value of the absolute value of the side lobe level in the preamble of IEEE 802.15.3c is 26 and the maximum value of the absolute value of the side lobe level in the preamble of IEEE 802.11ad is 38, the GCS in which the maximum value of the absolute value of the side lobe level is 25 or less may be selected.

In step S33, the signal sequence selection unit 342 selects GCS in which a code-word digital sum (CDS) of the sequence a after π/2-BPSK modulation is 0, from among the GCS selected in step S32.

In step S34, the signal sequence selection unit 342 selects GCS in which the CDS of the sequence a is 0, from among the GCS selected in step S33.

The GCSs a and b described with reference to FIG. 16 are determined as described above. By use of the GCSs a and b determined in this way, the side lobe level can be reduced.

<<8. Others>>
<8-1. Program>

The series of processing described above can be executed by hardware or software. In a case where the series of processing is executed by software, a program constituting the software is installed in a computer incorporated in dedicated hardware, a general-purpose personal computer, or the like.

The program to be installed is recorded and provided on the removable medium 321 illustrated in FIG. 27, which is configured from an optical disk (a compact disc-read only memory (CD-ROM), a digital versatile disc (DVD), or the like), a semiconductor memory, or the like. Further, the program may be provided via a wired or wireless transmission medium such as a local area network, the Internet, or digital broadcast. The program can be installed in the ROM 312 or the storage unit 318 in advance.

Note that the program executed by the computer may be a program processed in chronological order according to the order described in the present specification or may be a program executed in parallel or at necessary timing such as when a call is made.

Note that, in this specification, the term "system" means a group of a plurality of configuration elements (devices, modules (parts), and the like), and whether all the configuration elements are in the same casing is irrelevant. Therefore, a plurality of devices that is housed in separate casings and connected via a network, and one device that houses a plurality of modules in one casing are both systems.

The effects described in this specification are merely examples and are not limited, and other effects may be exhibited.

Embodiments of the present technology are not limited to the above-described embodiments, and various modifications can be made without departing from the gist of the present technology.

The steps described in the above-described flowcharts can be executed by one device or can be executed by a plurality of devices in a shared manner.

Furthermore, in a case where a plurality of processes is included in one step, the plurality of processes included in the one step can be executed by one device or can be shared and executed by a plurality of devices.

<8-2. Combination Example of Configurations>

The present technology may have the following configurations.

(1)

A transmission device including:

a generation unit configured to generate a preamble including a sequence [d d . . . d –d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d –d] and a sequence [d –d] is 25 or less; and a transmission unit configured to transmit data to be transmitted in units of frames to which the preamble is added.

(2)

The transmission device according to (1), in which the generation unit generates the preamble including the sequence d in which the maximum value of an absolute value of a side lobe level becomes minimum.

(3)

The transmission device according to (1) or (2), in which the generation unit generates the preamble including the sequence d in which a code-word digital sum (CDS) is 0 and the CDS after π/2-shift BPSK modulation is 0.

(4)

The transmission device according to any one of (1) to (3), in which a bit length of the sequence d is 128.

(5)

The transmission device according to any one of (1) to (4), in which the sequence d is a sequence obtained by applying [–1, –1, –1, +1, +1, –1, –1] as a weight vector and [8, 4, 16, 2, 32, 1, 64] as a delay vector to a generation expression.

(6)

A transmission method including the steps of:

generating a preamble including a sequence [d d . . . d –d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d –d] and a sequence [d –d] is 25 or less; and transmitting data to be transmitted in units of frames to which the preamble is added.

(7)

A program for causing a computer to execute processing including the steps of:

generating a preamble including a sequence [d d . . . d –d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d –d] and a sequence [d –d] is 25 or less; and transmitting data to be transmitted in units of frames to which the preamble is added.

(8)

A transmission device including:

a generation unit configured to generate a preamble including a combination of sequences a and b that are Golay complementary sequences and sequences –a and –b that are inverted sequences of the sequences a and b, and including, in a channel estimation sequence, a signal sequence of any of a first basic sequence [a b a –b a b –a b], a second basic sequence [a b –a b a b a –b], a third basic sequence [a –b a b a –b –a –b], a fourth basic sequence [a –b –a –b a –b a b], inverted sequences of the first to fourth basic sequences, reverse sequences of the first to fourth basic sequences, and reverse sequences of the inverted sequences of the first to fourth basic sequences; and a transmission unit configured to transmit data to be transmitted in units of frames to which the preamble is added.

(9)

The transmission device according to (8), in which the generation unit generates the preamble including, in the channel estimation sequence, a signal sequence of any of

[–a b a b a –b a b –a b a b] that is a first sequence including the first basic sequence,

[a –b a b –a b a b a –b a b] that is a second sequence including the second basic sequence,

[−a −b a −b a b a −b −a −b a −b] that is a third sequence including the third basic sequence,
[a b a −b −a −b a −b a b a −b] that is a fourth sequence including the fourth basic sequence,
inverted sequences of the first to fourth sequences,
reverse sequences of the first to fourth sequences, and
reverse sequences of the inverted sequences of the first to fourth sequences.

(10)
The transmission device according to (8) or (9), in which
the generation unit generates the preamble including the sequences a and b in which a code-word digital sum (CDS) is 0 and the CDS after π/2-shift BPSK modulation is 0.

(11)
The transmission device according to any one of (8) to (10), in which
bit lengths of the sequences a and b are 128.

(12)
A transmission method including the steps of:
generating a preamble including a combination of sequences a and b that are Golay complementary sequences and sequences −a and −b that are inverted sequences of the sequences a and b, and
including, in a channel estimation sequence, a signal sequence of any of
a first basic sequence [a b a −b a b −a b],
a second basic sequence [a b −a b a b a −b],
a third basic sequence [a −b a b a −b −a −b],
a fourth basic sequence [a −b −a −b a −b a b],
inverted sequences of the first to fourth basic sequences,
reverse sequences of the first to fourth basic sequences, and
reverse sequences of the inverted sequences of the first to fourth basic sequences; and
transmitting data to be transmitted in units of frames to which the preamble is added.

(13) A program for causing a computer to execute processing including the steps of:
generating a preamble including a combination of sequences a and b that are Golay complementary sequences and sequences −a and −b that are inverted sequences of the sequences a and b, and
including, in a channel estimation sequence, a signal sequence of any of
a first basic sequence [a b a −b a b −a b],
a second basic sequence [a b −a b a b a −b],
a third basic sequence [a −b a b a −b −a −b],
a fourth basic sequence [a −b −a −b a −b a b],
inverted sequences of the first to fourth basic sequences,
reverse sequences of the first to fourth basic sequences, and
reverse sequences of the inverted sequences of the first to fourth basic sequences; and
transmitting data to be transmitted in units of frames to which the preamble is added.

(14)
A reception device including:
a reception unit configured to receive a transmission signal of data in units of frames to which a preamble is added, the preamble including a sequence [d d . . . d −d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d −d] and a sequence [d −d] is 25 or less;
a demodulation unit configured to apply demodulation processing to a received signal; and
a synchronization unit configured to obtain cross correlation between a received signal sequence obtained by the demodulation processing and the sequence [d −d], and perform frame synchronization on the basis of threshold detection or maximum value detection of a cross correlation value.

(15)
A reception method including the steps of:
receiving a transmission signal of data in units of frames to which a preamble is added, the preamble including a sequence [d d . . . d −d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d −d] and a sequence [d −d] is 25 or less;
applying demodulation processing to a received signal; and
obtaining cross correlation between a received signal sequence obtained by the demodulation processing and the sequence [d −d], and performing frame synchronization on the basis of threshold detection or maximum value detection of a cross correlation value.

(16)
A program for causing a computer to execute processing including the steps of:
receiving a transmission signal of data in units of frames to which a preamble is added, the preamble including a sequence [d d . . . d −d] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [d d −d] and a sequence [d −d] is 25 or less;
applying demodulation processing to a received signal; and
obtaining cross correlation between a received signal sequence obtained by the demodulation processing and the sequence [d −d], and performing frame synchronization on the basis of threshold detection or maximum value detection of a cross correlation value.

(17)
A reception device including:
a reception unit configured to receive a transmission signal of data in units of frames to which a preamble is added, the preamble including a combination of sequences a and b that are Golay complementary sequences and sequences −a and −b that are inverted sequences of the sequences a and b, and
including, in a channel estimation sequence, a signal sequence of any of
a first basic sequence [a b a −b a b −a b],
a second basic sequence [a b −a b a b a −b],
a third basic sequence [a −b a b a −b −a −b],
a fourth basic sequence [a −b −a −b a −b a b],
inverted sequences of the first to fourth basic sequences,
reverse sequences of the first to fourth basic sequences, and
reverse sequences of the inverted sequences of the first to fourth basic sequences;
a demodulation unit configured to apply demodulation processing to a received signal;

a synchronization unit configured to perform frame synchronization on the basis of a received signal sequence obtained by the demodulation processing; and an equalization unit configured to obtain first cross correlation between the received signal sequence and first four sequences of the signal sequences included in the channel estimation sequence, obtain second cross correlation between the received signal sequence and last four sequences of the signal sequences, and perform channel estimation on the basis of the first cross correlation and the second cross correlation.

(18)

A reception method including the steps of: receiving a transmission signal of data in units of frames to which a preamble is added, the preamble including a combination of sequences a and b that are Golay complementary sequences and sequences −a and −b that are inverted sequences of the sequences a and b, and including, in a channel estimation sequence, a signal sequence of any of
  a first basic sequence [a b a −b a b −a b],
  a second basic sequence [a b −a b a b a −b],
  a third basic sequence [a −b a b a −b −a −b],
  a fourth basic sequence [a −b −a −b a −b a b],
  inverted sequences of the first to fourth basic sequences,
  reverse sequences of the first to fourth basic sequences, and
  reverse sequences of the inverted sequences of the first to fourth basic sequences;
applying demodulation processing to a received signal;
performing frame synchronization on the basis of a received signal sequence obtained by the demodulation processing;
obtaining first cross correlation between the received signal sequence and first four sequences of the signal sequences included in the channel estimation sequence, and obtaining second cross correlation between the received signal sequence and last four sequences of the signal sequences; and
performing channel estimation on the basis of the first cross correlation and the second cross correlation.

(19)

A program for causing a computer to execute processing including the steps of:
receiving a transmission signal of data in units of frames to which a preamble is added, the preamble including a combination of sequences a and b that are Golay complementary sequences and sequences −a and −b that are inverted sequences of the sequences a and b, and
including, in a channel estimation sequence, a signal sequence of any of
  a first basic sequence [a b a −b a b −a b],
  a second basic sequence [a b −a b a b a −b],
  a third basic sequence [a −b a b a −b −a −b],
  a fourth basic sequence [a −b −a −b a −b a b],
  inverted sequences of the first to fourth basic sequences,
  reverse sequences of the first to fourth basic sequences, and
  reverse sequences of the inverted sequences of the first to fourth basic sequences;
applying demodulation processing to a received signal;
performing frame synchronization on the basis of a received signal sequence obtained by the demodulation processing;
obtaining first cross correlation between the received signal sequence and first four sequences of the signal sequences included in the channel estimation sequence, and obtaining second cross correlation between the received signal sequence and last four sequences of the signal sequences; and
performing channel estimation on the basis of the first cross correlation and the second cross correlation.

REFERENCE SIGNS LIST

1 Transmission device
2 Reception device
101 Preamble generation unit
102 Header generation unit
103 Frame generation unit
121 GCS generation unit
122 Selector
123 Multiplier
341 Signal sequence generation unit
342 Signal sequence selecting unit

The invention claimed is:

1. A computer program product embodied on a non-transitory computer-readable data storage device in a manner that the computer program product is executable by a transmission device, the computer program product comprising:
  computer code for electronically generating, by a generation unit, a preamble including a sequence [a a . . . a −a] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [a a −a] and a sequence [a −a] is 25 or less; and
  computer code for electronically transmitting, by a transmission unit, data to be transmitted in units of frames to which the preamble is added.

2. The computer program product according to claim 1, wherein
  the generation unit generates the preamble including the sequence d in which the maximum value of an absolute value of a side lobe level becomes minimum.

3. The computer program product according to claim 1, wherein
  the generation unit generates the preamble including the sequence d in which a code-word digital sum (CDS) is 0 and the CDS after $\pi/2$-shift BPSK modulation is 0.

4. The computer program product according to claim 1, wherein
  a bit length of the sequence d is 128.

5. The computer program product according to claim 1, wherein
  the sequence d is a sequence obtained by applying [−1, −1, −1, +1, +1, −1, −1] as a weight vector and [8, 4, 16, 2, 32, 1, 64] as a delay vector to a generation expression.

6. A computer program product embodied on a non-transitory computer-readable data storage device in a manner that the computer program product is executable by a transmission device, the computer program product comprising:
  computer code for electronically generating, by a generation unit, a preamble including a combination of sequences a and b that are Golay complementary sequences and sequences −a and −b that are inverted sequences of the sequences a and b, and
    including, in a channel estimation sequence, a signal sequence of any of a first basic sequence [a b a −b a b −a b],
a second basic sequence [a b −a b a b a −b],
a third basic sequence [a −b a b a −b −a −b],
a fourth basic sequence [a −b −a −b a −b a b],
inverted sequences of the first to fourth basic sequences,
reverse sequences of the first to fourth basic sequences, and
reverse sequences of the inverted sequences of the first to fourth basic sequences; and
computer code for electronically transmitting, by a transmission unit, data to be transmitted in units of frames to which the preamble is added.

7. The computer program product according to claim 6, wherein
the generation unit generates the preamble including, in the channel estimation sequence, a signal sequence of any of
[−a b a b a −b a b −a b a b] that is a first sequence including the first basic sequence,
[a −b a b −a b a b a −b a b] that is a second sequence including the second basic sequence,
[−a −b a −b a b a −b −a −b a −b] that is a third sequence including the third basic sequence,
[a b a −b −a −b a −b a b a −b] that is a fourth sequence including the fourth basic sequence,
inverted sequences of the first to fourth sequences,
reverse sequences of the first to fourth sequences, and
reverse sequences of the inverted sequences of the first to fourth sequences.

8. The computer program product according to claim 6, wherein
the generation unit generates the preamble including the sequences a and b in which a code-word digital sum (CDS) is 0 and the CDS after π/2-shift BPSK modulation is 0.

9. The computer program product according to claim 6, wherein
bit lengths of the sequences a and b are 128.

10. A computer program product embodied on a non-transitory computer-readable data storage device in a manner that the computer program product is executable by a reception device, the computer program product comprising:
computer code for electronically receiving by, a reception unit, a transmission signal of data in units of frames to which a preamble is added, the preamble including a sequence [a a . . . a −a] having iteration of a sequence d that is one of sequences a and b that are Golay complementary sequences, followed by an inverted sequence of the sequence d, and including a signal sequence in which a maximum value of an absolute value of a side lobe level of cross correlation between a sequence [a a −a] and a sequence [a −a] is 25 or less;
computer code for electronically applying, by a demodulation unit, demodulation processing to a received signal; and
computer code for electronically obtaining, by a synchronization unit, cross correlation between a received signal sequence obtained by the demodulation processing and the sequence [a −a], and perform frame synchronization on the basis of threshold detection or maximum value detection of a cross correlation value.

11. A reception device comprising:
computer code for electronically receiving, by a reception unit, a transmission signal of data in units of frames to which a preamble is added, the preamble including a combination of sequences a and b that are Golay complementary sequences and sequences −a and −b that are inverted sequences of the sequences a and b, and
including, in a channel estimation sequence, a signal sequence of any of
a first basic sequence [a b a −b a b −a b],
a second basic sequence [a b −a b a b a −b],
a third basic sequence [a −b a b a −b −a −b],
a fourth basic sequence [a −b −a −b a −b a b],
inverted sequences of the first to fourth basic sequences,
reverse sequences of the first to fourth basic sequences, and
reverse sequences of the inverted sequences of the first to fourth basic sequences;
computer code for electronically applying, by a demodulation unit, demodulation processing to a received signal;
computer code for electronically performing, by a synchronization unit frame synchronization on the basis of a received signal sequence obtained by the demodulation processing; and
computer code for electronically obtaining, by an equalization unit first cross correlation between the received signal sequence and first four sequences of the signal sequences included in the channel estimation sequence, obtain second cross correlation between the received signal sequence and last four sequences of the signal sequences, and perform channel estimation on the basis of the first cross correlation and the second cross correlation.

* * * * *